(12) United States Patent
Hiroishi et al.

(10) Patent No.: US 11,898,775 B2
(45) Date of Patent: Feb. 13, 2024

(54) CONDITIONING VENTILATION SYSTEM

(71) Applicant: FH alliance Inc., Kasugai (JP)

(72) Inventors: Kazuro Hiroishi, Kasugai (JP); Mitsunori Matsubara, Kasugai (JP)

(73) Assignee: FH ALLIANCE INC., Kasugai (JP)

( * ) Notice: Subject to any disclaimer, the term of this patent is extended or adjusted under 35 U.S.C. 154(b) by 0 days.

(21) Appl. No.: 18/020,041

(22) PCT Filed: Aug. 17, 2021

(86) PCT No.: PCT/JP2021/030016
§ 371 (c)(1),
(2) Date: Feb. 6, 2023

(87) PCT Pub. No.: WO2022/039151
PCT Pub. Date: Feb. 24, 2022

(65) Prior Publication Data
US 2023/0243529 A1  Aug. 3, 2023

(30) Foreign Application Priority Data
Aug. 17, 2020 (JP) ................................ 2020-137383

(51) Int. Cl.
*F24F 7/08* (2006.01)
*F24F 7/003* (2021.01)

(52) U.S. Cl.
CPC .............. *F24F 7/08* (2013.01); *F24F 7/003* (2021.01)

(58) Field of Classification Search
CPC .... F24F 7/08; F24F 7/003; F24F 11/74; F24F 2110/50; F24F 2110/64; F24F 1/0033;
(Continued)

(56) References Cited

U.S. PATENT DOCUMENTS

2020/0292198 A1   9/2020 Funada

FOREIGN PATENT DOCUMENTS

| JP | 2006-10186 A | 1/2006 |
|---|---|---|
| JP | 2006-84148 A | 3/2006 |

(Continued)

OTHER PUBLICATIONS

Tranlation KR-20110004229-U, Apr. 2011 (Year: 2011).*
(Continued)

*Primary Examiner* — Jessica Yuen
(74) *Attorney, Agent, or Firm* — Kratz, Quintos & Hanson, LLP

(57) ABSTRACT

The present invention provides a conditioning ventilation system 1. In the conditioning ventilation system 1, each of a plurality of rooms in a building is provided with an air-intake portion 16 and an exhaust means 19, the air-intake portions 16 are provided with a plurality of air blowing sections 13 which send wind through a plurality of ducts 17, a return air path which joins up from a plurality of the exhaust means 19 and returns to the air blowing sections 13 is provided, indoor air is circulated in the building by the air blowing sections 13, an outdoor air introduction path having an opening/closing mechanism is connected to the return air path, each of the plurality of rooms is provided with an exhaust means 26 directing to outdoor and having an opening/closing mechanism 27, outdoor air and indoor air are circulated in the building and, in this state, switching operation can be carried out to discharge air to outdoor independently in the plurality of rooms, energy saving and comfortable space having uniform temperature and excellent air quality is normally realized, and when harmful material flows in or is generated, the harmful material is prevented from being dispersed to another room while swiftly dis-
(Continued)

charging the harmful material, and heat and air quality of return air are effectively utilized.

12 Claims, 4 Drawing Sheets

(58) Field of Classification Search
CPC ........ F24F 1/0041; F24F 1/0035; F24F 3/044; F24F 2011/0002; F24F 2011/0006; F24F 3/00; F24F 7/06; F24F 7/10; F24F 11/0001; F24F 11/77; F24F 12/006; Y02B 30/56
See application file for complete search history.

(56) References Cited

FOREIGN PATENT DOCUMENTS

| | | | |
|---|---|---|---|
| JP | 2006-105408 A | | 4/2006 |
| JP | 2006-284150 A | | 10/2006 |
| JP | 2012-202171 A | | 10/2012 |
| KR | 20110004229 U | * | 4/2011 |
| WO | WO-8907738 A1 | * | 8/1989 |
| WO | 2019/107163 A1 | | 6/2019 |

OTHER PUBLICATIONS

International Search Report for International Application No. PCT/JP2021/030016 dated Oct. 4, 2021 (2 sheets, 2 sheets translation, 4 sheets total).

* cited by examiner

[FIG 1]
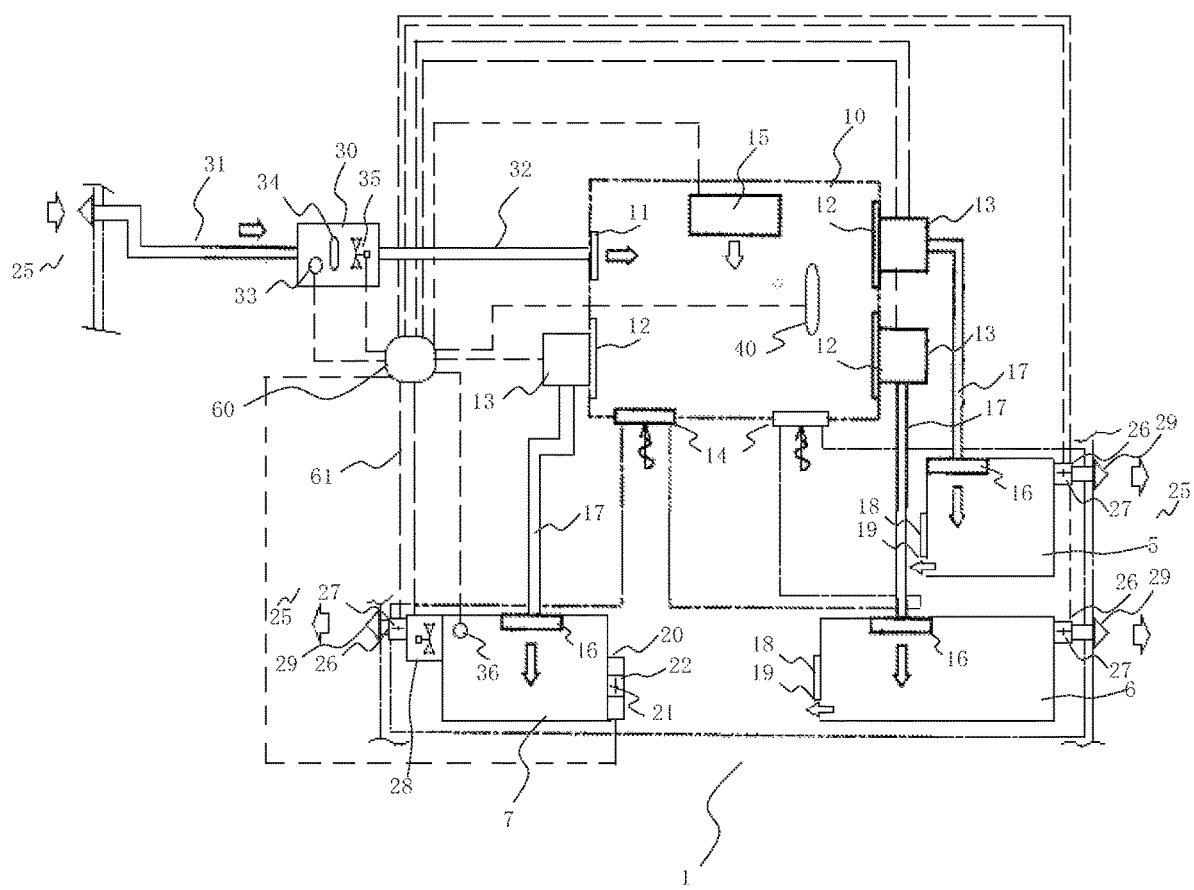

[FIG 2]
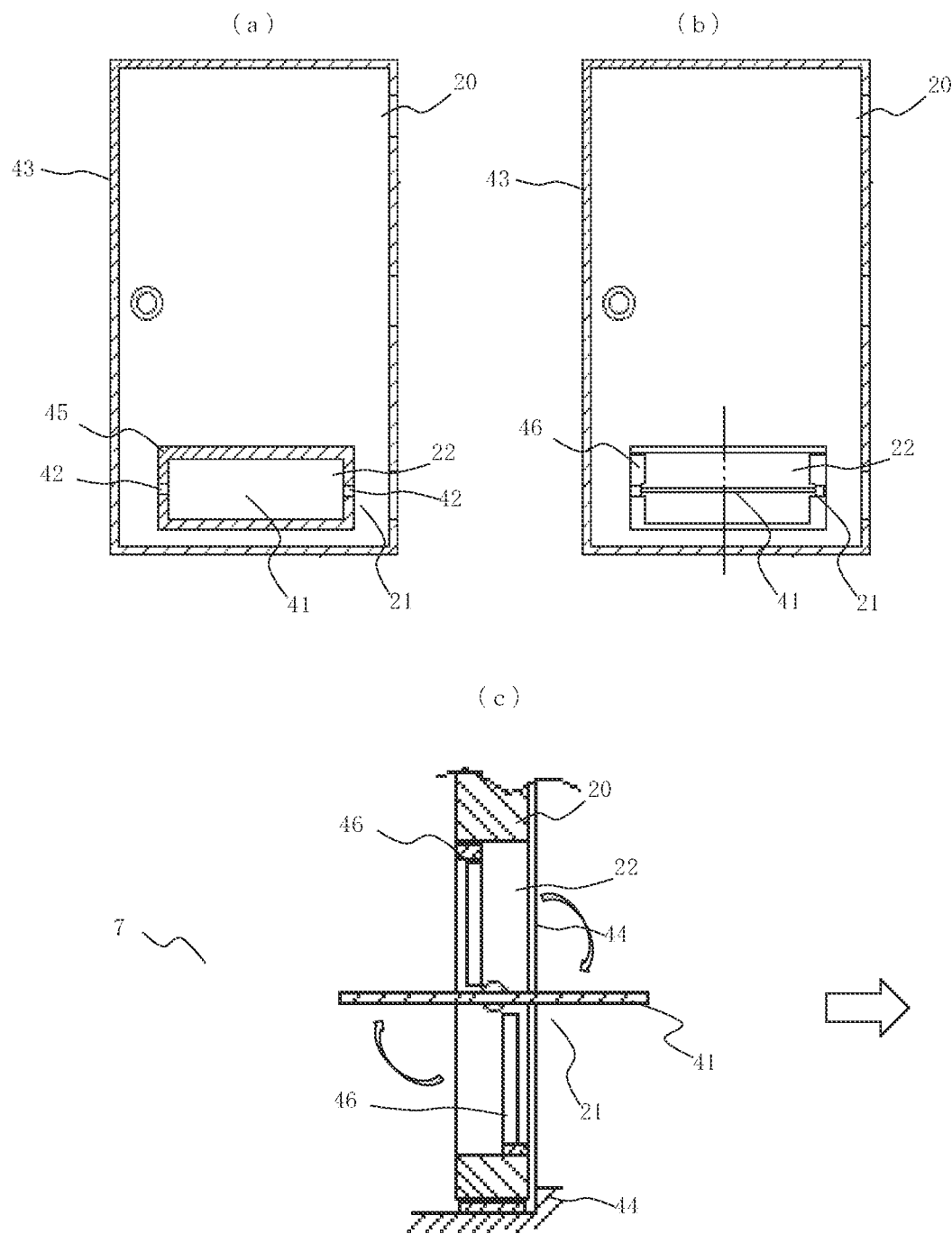

[FIG 3]
(a)
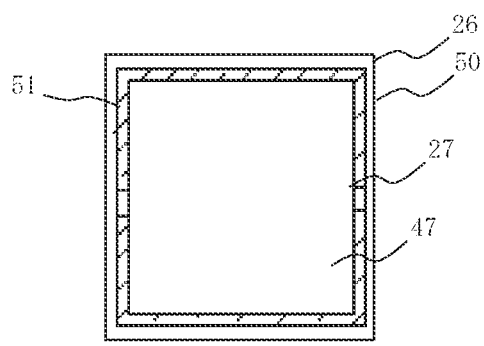
(b)
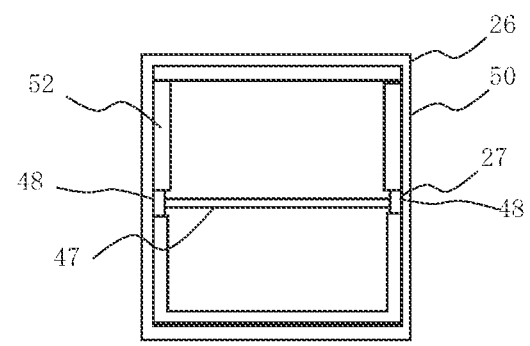
(c)
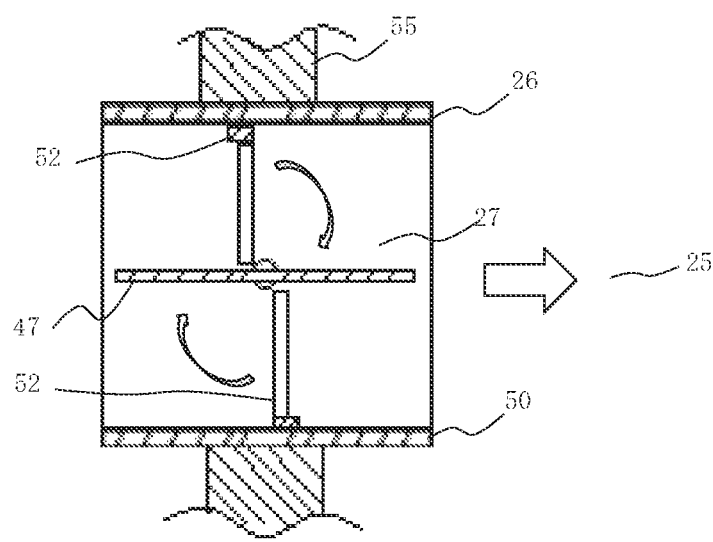

[FIG 4]
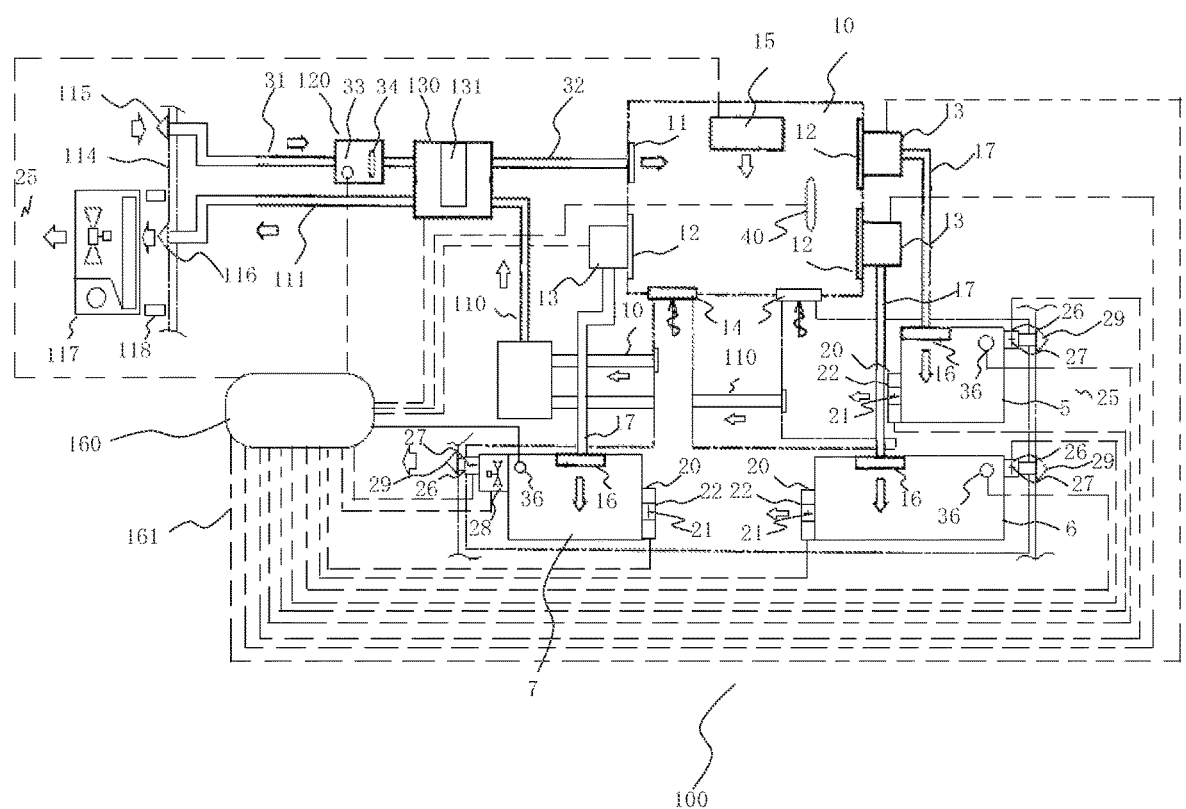

CONDITIONING VENTILATION SYSTEM

TECHNICAL FIELD

The present invention relates to a conditioning ventilation system which ventilates and air-conditions a plurality of rooms in a building.

BACKGROUND TECHNIQUE

In buildings, for energy saving and comfortable life, airtightness and heat insulation are enhanced more and more. Further, to realize air cleanness and healthy life, ventilation is more emphasized.

In a residential house and a non-residential house having a conditioning ventilation system which totally ventilates and air-conditions a room and a space in a building, air which ventilates and air-conditions circulates each room and each space in the building. Therefore, there is a risk that harmful material such as smell and bacteria which are generated or which flows into the room and the space flows into another room, another space and a passage, other people is displeased and infected with bacteria.

If ventilation airflow of the entire building is increased to the number of ventilation operations 6 to 12/hour or more and air in the building is replaced with outdoor air according to a guild line (see home page of Ministry of Health, Labour, and Welfare, in literature Commercial Facilities concerning ventilation to improve "poorly ventilated closed space", P1-P2, Mar. 30, 2020) of U.S. Centers for Disease Control and Prevention (CDC (2003)), harmful material such as smell and bacteria can be discharged. However, noise is also increased, initial cost is high and air-conditioning load is largely increased and therefore, running cost is also high and hence, in a general residential house and a non-residential house, it is actually difficult to realize this.

When a system which ventilates and air-conditions in each of rooms and spaces is introduced, since air which ventilates and air-conditions circulates only in the room and the space, there is no risk that smell and bacteria flow into another room or another space, but initial costa and running cost are increased, and space for the system is also required. Distribution of moisture, bacteria, dust and smell becomes non-uniform in the room and space due to shapes of the rooms and spaces, installation of the system and operational state, and uncomfortable room and space are generated.

Conventionally, there is a known conditioning ventilation system of this kind in which outside air is introduced into a room to make air-conditioned air, pressure in the room is made negative by an exhaust fan, air blown from the air conditioner is uniformly introduced into the room and the air is evacuated (see patent document 1 for example).

Each of a plurality of rooms is provided with a blowoff port of an air-supply fan and a suction port of an exhaust fan, outside air is sterilized by a sterilizing device provided in an air-supply exhaust duct, and the outside air is introduced into the rooms and evacuated. It is known that a negative pressure cabin whose pressure is kept negative by an auxiliary ventilation fan is air-conditioned by an air conditioner and exhaust gas for preventing the air from reversely flowing from this room to another room is sterilized (see patent document 2 for example).

To restrain harmful material generated in an arbitral room among a plurality of mutually communicated rooms from diffusing to another room, all of the rooms are normally ventilated in a class 3 centralized ventilation manner and ventilation of a room in which harmful material is generated is switched to class 1 ventilation. It is known that an air supply amount (return air and air which air-conditions outside air) in the room where the harmful material is generated is made smaller than an exhausted air amount of the ventilation device (see patent document 3 for example).

Further, to prevent diffusion when harmful material is generated in a certain, it is known that the harmful material is prevented from flowing into another room by a harmful material sensor, an exhaust fan, an air-supply fan and an outdoor discharging damper, and the harmful material is discharged to outside of the room (see patent document 4 for example).

PRIOR ART DOCUMENTS

Patent Documents

[Patent Document 1] Japanese Patent Application Laid-open No. H06-221612
[Patent Document 2] Japanese Patent Application Laid-open No. 2005-257198
[Patent Document 3] Japanese Patent Application Laid-open No. 2019-211139
[Patent Document 4] Japanese Patent Application Laid-open No. 2018-151114

SUMMARY OF THE INVENTION

Problem to be Solved by the Invention

However, according to the conditioning ventilation system described in patent document 1, when harmful material flows from outside of a room, or when harmful material is generated in a room, bacteria are eliminated by a moth-repellent/sterilizing unit, but it is assumed that moth-repellent/sterilizing operation is carried out in the night when people do not exist in an office or the like, and when people exist, the sterilizing operation cannot be carried out, it is not assumed that the sterilizing operation is carried out in a plurality of spaces or rooms, and since outside air is always air-conditioned, there is a problem that an air-conditioning load is large, and initial cost and running cost are increased.

According to the conditioning ventilation system described in patent document 2, a room where pressure is kept negative is provided with an auxiliary ventilation fan, and the plurality of rooms are connected to each other through exhaust ducts. Therefore, there is a problem that bacteria which are not sterilized by a sterilizing device flow into another room. Further, since outside air is always brought into and air-conditioned outside air is discharged, there is a problem that an air-conditioning load is large, temperature between rooms is not uniform and it is uncomfortable.

Further, according to the conditioning ventilation system described in patent document 3, rooms where a class 1 ventilating device and a class 3 ventilating device are fixed to each other. Therefore, when harmful material is generated in the room where the class 3 ventilating device is placed, there is a problem that it is not possible to prevent the harmful material from diffusing to another room. Further, there is a problem that if all of the rooms are provided with the class 1 ventilating devices, the initial cost is increased. Further, if harmful material is generated to another room by return air of air supplied to each of the rooms of the conditioning ventilation system of the entire building, there is a risk that the harmful material diffuses to another room.

According to the conditioning ventilation system described in patent document 4, there is no description about ventilation of another room, air-conditioning of each of rooms and movement of air between the rooms, ventilation of the entire building cannot be carried out, and it is not possible to handle when a generation place of harmful material is changed.

The present invention has been achieved to solve the conventional problems, and the invention normally carries out ventilation and air-conditioning of each of rooms and each of spaces appropriately, and the invention always realizes high quality, comfortable and clean air and space having uniform temperature while saving energy. When harmful material such as smell and bacteria flows into and is generated in any of the spaces, the harmful material is swiftly discharged, the harmful material is prevented from diffusing to another space from that space and an air path, harmful material flows in, air-conditioned air supplied to a space where the harmful material is not generated is again used for air-conditioning, and heat of return air and air quality are effectively utilized. Therefore, it is an object of the invention to provide a comfortable conditioning ventilation system while saving energy.

Further, by providing a flow path of return air with a sterilizing or deodorizing function, harmful material and smell of a large amount of air circulating in a building are sterilized and deodorized and therefore, it is an object of the invention to provide a more safely, healthy and comfortable conditioning ventilation system.

Means for Solving Problem

To achieve the above object, in a conditioning ventilation system of the present invention, each of a plurality of rooms in a building is provided with an air-intake portion and an exhaust port, the air-intake portion is provided with a plurality of air blowing sections for sending wind through a plurality of ducts, a return air path which joins up from the plurality of exhaust ports and returns to the air blowing section is provided, indoor air is circulated in the building by the air blowing section, an outdoor air introduction path having an opening/closing mechanism is connected to the return air path, each of the plurality of rooms is provided with an exhaust port to outdoor having the opening/closing mechanism, outdoor air and the indoor air are circulated in the building, and the outdoor air and the indoor air can be switched such that they are discharged to outdoor in each of the plurality of rooms independently.

By this means, the air-conditioned indoor air is circulated from the air-intake portion to the plurality of rooms in the building by the air blowing section, return air which is air after the air-conditioning joins up from the exhaust ports of the plurality of rooms, e.g., from an undercut of a door, the return air passes through the return air path, and the return air is again air-conditioned by an air-conditioning section and returns to the air blowing section.

Since indoor air is supplied to the plurality of rooms, pressure therein becomes positive as compared with outdoor, and since air is sucked into the air blowing section at the joining portion of the return air path, the pressure becomes negative as compared with outdoor. Therefore, by adjusting the opening/closing mechanism of the exhaust port to the outdoor of the plurality of rooms, e.g., by adjusting an opening/closing amount of a window, when indoor air including harmful material is generated and flows into a certain room, an amount of the indoor air including the harmful material can be adjusted from an opened portion of the window of the room. Further, by adjusting the opening/closing mechanism of the outdoor air introduction path connected to the return air path, e.g., by adjusting the opening/closing amount of the window, an amount of outdoor air introduced into the return air path can be adjusted. Since the outdoor air introduction path is connected to the joining portion of the return air path, negative pressure of an undercut of a door of a room whose window is closed is lower than negative pressure of an undercut of a room whose window is opened, a pressure difference between outdoor and the negative pressure of the air where these air flows join up is relatively stable, and outdoor air is stably introduced even if a fan for introducing outdoor air does not exist. By these reasons, a discharging operation of the indoor air of the room and a supply operation of indoor air are simultaneously carried out with a relatively simple configuration, and even if harmful material flows in or is generated, it is possible to obtain a conditioning ventilation system capable of supplying fresh air while discharging the harmful material to outdoor.

According to another means, an exhaust port including an air-intake portion and an opening/closing mechanism and directing to outdoor is provided in each of a plurality of rooms in a building, the air-intake portion and an exhaust port are provided in a space other than the plurality of rooms, a plurality of air blowing sections for sending wind through a plurality of ducts are provided in the air-intake portion, a return air path which joins up from the plurality of exhaust ports and which returns to the air blowing section is provided, an air-conditioning compartment having at least one air-conditioning section and the plurality of air blowing sections is provided on the way to the return air path, an outdoor air introduction path connected to the return air path is provided with a fan which introduces outdoor air, in a conditioning ventilation system which can be switched to discharge air to outdoor independently in each of the plurality of rooms while circulating the outdoor air and indoor air in the building, and a total blast volumes of the plurality of air blowing sections is greater than an air-conditioning blast volume of the air-conditioning section and an outdoor air introducing volume of the fan.

According to this means, fresh outdoor air introduced by the fan and return air which is air-conditioned air in a space other than the plurality of rooms, e.g., spaces under floor, under roof and a storage room flow from the exhaust port, e.g., an undercut of a door into the air-conditioning compartment through the return air path, air is conditioned by the air-conditioning section, mixed air of outdoor air, air-conditioned air and return air is sent to each of the rooms and spaces by the air-intake portions of the plurality of rooms, the air-intake portion of the space other than the plurality of rooms and the plurality of air blowing sections connected through the duct, thereby air-conditioning the rooms and the spaces. Since pressure in the rooms becomes positive as compared with outdoor, the opening/closing mechanism of the exhaust port, e.g., opening/closing degree of the window is adjusted such that indoor air of the room is pushed out and, in this state, the indoor air is replaced with the mixed air. Therefore, it is possible to obtain a conditioning ventilation system in which air is discharged from the room and fresh air having appropriate temperature is supplied simultaneously, and even if harmful material flows in or is generated, a comfortable space can be maintained by adjusting the blast volume by the air blowing section and by adjusting the outdoor air introducing volume by the fan while discharging the harmful material to outdoor. In the air-conditioning compartment, since the total blast volume sent by the air blowing section is greater than the air-conditioned air volume conditioned by the air-conditioning section and the outdoor air introducing volume of the fan, the outdoor air, the air-conditioned air and the return air are mixed well, and a large amount of fresh air having small temperature difference between the outdoor air and the average room temperature is sent to the room. Therefore, it is possible to obtain a conditioning ventilation system which brings the room into a healthy and comfortable space having uniform temperature.

In another means, the exhaust port directing to the outdoor is provided with a ventilation fan.

According to this, air volume of the ventilation fan provided in the exhaust port directing to outdoor, e.g., window connected to the outdoor is variably controlled and an exhausting operation of small air volume is carried out as usually 24 hour ventilation and a healthy and comfortable space is realized with saved energy and harmful material flows in or is generated, an exhausting operation of a large air volume is carried out, and harmful material can be discharged more swiftly and reliably, a risk that the harmful material is dispersed to another room from a gap is small, and it is possible to obtain a conditioning ventilation system capable of controlling the air-conditioning operation in more detail and capable of controlling ventilation.

According to another means, each of a plurality of rooms in a building is provided with an exhaust port having an air-intake portion, an exhaust port and an opening/closing mechanism and directing to outdoor, a room other than the plurality of rooms is provided with the air-intake portion, the exhaust port directing to the outdoor and a door having high airtightness, the air-intake portion is provided with a plurality of air blowing sections which send wind through a plurality of ducts, there is provided a return air path which joins up with the plurality of exhaust ports from the door having the high airtightness and which returns to the air blowing section, an air-conditioning compartment having at least one air-conditioning section and the plurality of air blowing sections is provided on the way to the return air path, an outdoor air introduction path connected to the return air path is provided with a fan which introduces outdoor air, in a conditioning ventilation system capable of switching to exhaust gas to outdoor independently in the plurality of rooms and the room other than the plurality of rooms while circulating the outdoor air and the indoor air in the building, and a total blast volumes of the plurality of air blowing sections is greater than air-conditioned air volume of the air-conditioning section and outdoor air introducing volume of the fan.

According to this, the room other than the plurality of rooms, e.g., a recuperation room or a smoking room where a probability that harmful material or smell is generated is high is provided with the door having high airtightness, only return air which is air-conditioned air in the plurality of rooms flows into the air-conditioning compartment from an undercut of the door through the return air path, air is air-conditioned by the air-conditioning section together with outdoor air which is introduced by the fan, mixed air of outdoor air, air-conditioned air and return air is sent from the air-intake portion of the plurality of rooms and the room other than the plurality of rooms directly through the duct, pressure in each of the rooms becomes positive as compared with the outdoor, air including harmful material or smell in the room other than the plurality of rooms is replaced with mixed air while being discharged to outdoor from the exhaust port directing to the outdoor, e.g., from an opened portion of the window such that the air is pushed out, the air is discharged to outdoor from the exhaust port directing to the outdoor, a portion of air-conditioned air returns from the exhaust port to the air-conditioning compartment as return air and therefore, even if harmful material flows in or is generated in the room other than the plurality of rooms, the harmful material is swiftly discharged to outdoor, a risk that harmful material or smell is dispersed to the other room is low, air-conditioning corresponding to a load of the room is carried out in the plurality of rooms by adjusting blast volume sent by the air blowing section, return air volume from the undercut and the exhaust gas volume by opening and closing of the window, and since heat and air quality of partial air-conditioned air are again utilized for air-conditioning, a further energy saving and efficient conditioning ventilation system is obtained. A total blast volume sent by the air blowing section in the air-conditioning compartment is greater than air-conditioned air volume by the air-conditioning section and outdoor air introducing volume of the fan. Therefore, outdoor air, air which is air-conditioned by the air-conditioning section and return air from the plurality of rooms are mixed well, a large amount of fresh air having a small temperature difference between outdoor air and average room temperature is sent to each of the rooms and therefore, an energy-saving conditioning ventilation system in which each room becomes a heathy and comfortable space having uniform temperature is obtained.

In another means, the exhaust port directing to the outdoor is provided with a ventilation fan.

According to this, air volume of the ventilation fan provided in the exhaust port directing to outdoor, e.g., window connected to the outdoor is variably controlled and an exhausting operation of small air volume is carried out usually in a room other than the plurality of rooms as usually 24 hour ventilation by the ventilation fan, more detailed air-conditioning corresponding to a load of a room is carried out in a plurality of rooms by adjusting blast volume sent by the air blowing section, return air volume from an undercut and exhaust gas volume by a ventilation fan provided in a window, energy-saving, healthy and comfortable space is realized, and when harmful material flows in or is generated in a room other than a plurality of rooms, an exhausting operation of a large air volume is carried out by the ventilation fan, and it is possible to obtain a conditioning ventilation system in which harmful material can be discharged more swiftly and reliably, and a risk that the harmful material is dispersed to another room is further reduced.

According to another means, each of a plurality of rooms in a building is provided with an air-intake portion and an exhaust port, a room other than the plurality of rooms is provided with the air-intake portion, an exhaust port directing to outdoor and a door having high airtightness, the air-intake portion is provided with a plurality of air blowing sections which send wind through a plurality of ducts, a return air path which joins up from the plurality of exhaust ports and the door having the high airtightness and which returns to the air blowing section is provided, an air-conditioning compartment having at least one air-conditioning section and the plurality of air blowing sections is provided on the way to the return air path, an outdoor air introduction path and an indoor air discharging path connected to the return air path are provided with a heat-exchanging ventilating unit which heat-exchanges outdoor air and a portion of return air from the exhaust port, and which introduces the outdoor air to the return air path and discharges a portion of the return air to outdoor, in a conditioning ventilation system capable of switching to discharge air to outdoor independently in the rooms other than the plurality of rooms while circulating the heat-exchanged outdoor air and indoor air, and a total blast volume sent by the plurality of air blowing sections is greater than air-conditioned air volume of the air-conditioning section and outdoor air introducing volume of the heat-exchanging ventilating unit.

According to this, the room other than the plurality of rooms, e.g., a recuperation room or a smoking room where a probability that harmful material or smell is generated is high is provided with the door having high airtightness, a portion of return air which is air-conditioned air in the plurality of rooms flows into the air-conditioning compartment from an undercut of the door, and the portion of the return air heat-exchanges with outdoor air by the heat-exchanging ventilating unit and is discharged to outdoor. The heat-exchanged outdoor air and the portion of the return air are air-conditioned by the air-conditioning section, mixed air of the outdoor air, the air-conditioned air and the return air is sent from the air-intake portion of the plurality of rooms and the room other than the plurality of rooms through the ducts, pressure in the room other than the plurality of rooms becomes positive as compared with outdoor air, air including harmful material and smell is discharged to outdoor from the exhaust port directing to the outdoor, e.g., an opened portion of a window and, in this state, the air is replaced with mixed air, air-conditioned air returns to the air-conditioning compartment and the heat-exchanging ventilating unit from the exhaust port, e.g., from the undercut of the door as return air in the plurality of rooms and therefore, even if harmful material flows in or is generated in the room other than the plurality of rooms, the harmful material is swiftly discharged to outdoor, a risk that harmful material or smell is dispersed to another room is further reduced, air-conditioning corresponding to a load of the room is carried out by adjusting blast volume sent by the air blowing section, return air volume from the undercut, exhaust gas volume and outdoor air introducing volume by the heat-exchanging ventilating unit, discharging heat is recovered, heat and air quality of partial air-conditioned air are again utilized for air-conditioning as return air and therefore, a further energy-saving and efficient conditioning ventilation system is obtained. In the air-conditioning compartment, a total blast volume sent by the air blowing section is greater than air-conditioned air volume made by the air-conditioning section and outdoor air introducing volume made by the heat-exchanging ventilating unit. Therefore, outdoor air, air which is air-conditioned by the air-conditioning section and return air of the plurality of rooms are well mixed, and a large amount of fresh air having a small temperature difference between the outdoor air temperature and the average room temperature is sent to each of the rooms. Hence, a conditioning ventilation system in which rooms become healthy and comfortable rooms having uniform temperature is obtained.

According to another means, an exhaust port directing to the outdoor is provided with a ventilation fan.

According to this, it is possible to obtain a conditioning ventilation system in which air volume of the exhaust port directing to the outdoor, e.g., a ventilation fan provided in a window is variably controlled, an exhausting operation of small air volume is carried out by the ventilation fan as usually 24 hour ventilation in the room other than the plurality of rooms, heat exchange is efficiently carried out by the heat-exchanging ventilating unit with saved energy in the plurality of rooms, more detailed air-conditioning corresponding to a load of a room is carried out by adjusting blast volume made by the air blowing section, return air volume from the undercut, exhaust gas volume and outdoor air introducing volume made by the heat-exchanging ventilating unit, an energy-saved, healthy and comfortable space is realized, and when harmful material flows in or is generated in a room other than the plurality of rooms is generated, an exhausting operation of large air volume is carried out by the ventilation fan, the harmful material can be discharged more swiftly and reliably, and a risk that the harmful material is dispersed from a gap can be reduced.

According to another means, a room other than the plurality of rooms is provided with an exhaust port having an opening/closing mechanism connected to the return air path.

According to this, when harmful material or smell is not generated in the room other than the plurality of rooms, e.g., a room such as a recuperation room and a smoking room where a probability that the harmful material or smell is generated is high, return air volume which is air-conditioned air in a room other than the plurality of rooms is adjusted by adjusting an opening and closing degree of an opening/closing mechanism of the exhaust port connected to the return air path, e.g., a window provided in a door having high airtightness connected to a passage way, heat of return air is utilized for air-conditioning in the air-conditioning compartment, heat is recovered by the heat-exchanging ventilating unit, and a more energy-saving and efficient conditioning ventilation system is obtained.

According to another means, each of a plurality of rooms in a building is provided with an air-intake portion, an exhaust port having an opening/closing mechanism, an exhaust port directing to outdoor having an opening/closing mechanism, and a door having high airtightness, the air-intake portion is provided with a plurality of air blowing sections which send wind through a plurality of ducts, a return air path which joins up from the plurality of exhaust ports and the door having high airtightness and which returns to the air blowing section is provided, an air-conditioning compartment having at least one air-conditioning section and the plurality of air blowing sections is provided on the way to the return air path, an outdoor air introduction path and an indoor air discharging path connected to the return air path are provided with a heat-exchanging ventilating unit which heat-exchanges outdoor air and a portion of return air from the exhaust port, and which introduces the outdoor air to the return air path and discharges a portion of the return air to outdoor, in a conditioning ventilation system capable of switching to air to outdoor independently in each of the plurality of rooms while circulating the heat-exchanged outdoor air and indoor air, and a total blast volumes of the plurality of air blowing sections is greater than air-conditioned air volume of the air-conditioning section and outdoor air introducing volume of the heat-exchanging ventilating unit.

According to this, a room is not selected, an opening/closing mechanism of exhaust port of usually a plurality of rooms, e.g., a window provided in a door connected to a passage way and having high airtightness is opened, an opening/closing mechanism of an exhaust port directing to outdoor, e.g., a window connected to outdoor for example is closed, a portion of return air which is air after it is air-conditioned flows in an air-conditioning compartment, and a portion of the return air is heat-exchanged with outdoor air by a heat-exchanging ventilating unit and is discharged to outdoor. The heat-exchanged outdoor air and a portion of the return air are air-conditioned by an air-conditioning section, mixed air of outdoor air, air-conditioned air and return air is sent from air-intake portions of a plurality of rooms directly through ducts, air-conditioning corresponding to a load of the room is carried out by adjusting blast volume made by the air blowing section, return air volume from an opened portion of the window of the door having high airtightness, and exhaust gas volume made by the heat-exchanging ventilating unit and outdoor air introducing volume, exhausting heat is recovered, and heat and air quality of partial air after it is air-conditioned are again utilized for air-conditioning as return air and therefore, an energy-saving efficient conditioning ventilation system is obtained. When a room is not selected and harmful material or smell is generated, the window of the door having high airtightness of the room is closed, a window connected to outdoor is opened, pressure becomes positive as compared with outdoor by wind sent from the air-intake portion, air including harmful material or smell is discharged to outdoor from an opened portion of the window such that air is pushed out, the air is replaced with mixed air, and it is possible to obtain a conditioning ventilation system in which even if harmful material flows in or is generated, the harmful material can be discharged to outdoor swiftly, and a risk that harmful material or smell is dispersed to another room is small. Since a total blast volume made by the air blowing section in the air-conditioning compartment is greater than air-conditioned air volume made by the air-conditioning section and outdoor air introducing volume made by the heat-exchanging ventilating unit, outdoor air, air which is air-conditioned by the air-conditioning section, and return air of the plurality of rooms are well mixed, and a large volume of fresh air having a small temperature difference between outdoor air and the average room temperature is sent to each of the room and therefore, it is possible to obtain a conditioning ventilation system in which the rooms become healthy and comfortable rooms having uniform temperature with saved energy.

According to another means, an exhaust port directing to the outdoor is provided with a ventilation fan.

According to this, it is possible to obtain a conditioning ventilation system in which when a room is not selected and operation of the exhaust port directing to exhaust port e.g., the ventilation fan provided in a window connected to outdoor for example is stopped and harmful material flows in or is generated, exhausting operation of large air volume is carried out by the ventilation fan of the room, the harmful material can be discharged more swiftly and reliably, and a risk that the harmful material is dispersed from a door having high airtightness, or a gap of the window can be reduced. The window of the door of the room having high airtightness is closed between periods of spring or fall or at night in summer, the window connected to the outdoor is opened, air volume of the ventilation fan is adjusted, heat exchange between outdoor air and return air is not carried out, outdoor air is introduced into the air-conditioning compartment by the heat-exchanging ventilating unit, wind is sent from the air-intake portion of each of the rooms by the air blowing section, thereby air-conditioning and ventilating is carried out mainly by outdoor air and therefore, a more energy saving and efficient conditioning ventilation system is obtained.

Another means includes a positive pressure mode in which blast volume made by the air blowing section of each of the plurality of rooms or a room other than the plurality of rooms is greater than exhaust gas volume made by the ventilation fan of the exhaust port directing to the outdoor, a balance mode in which the blast volume and the exhaust gas volume are equal to each other, and a negative pressure mode in which the exhaust gas volume is greater than the blast volume.

According to this, it is possible to obtain a conditioning ventilation system in which usually in the positive pressure mode, energy saving comfortable operation is carried out in a state where air-conditioning takes priority, and immediately after harmful material or smell is generated or when harmful material is dispersed and smell becomes strong, healthy operation is carried out by large exhaust gas volume in a state where ventilation takes priority and in other cases, in the balance mode, healthy comfortable operation in which ventilation and air-conditioning are balanced is carried out.

In another means, sterilizing or deodorizing means is provided on the way to the return air path.

According to this, when harmful material or smell is included in outdoor air introduced from outdoor into the air-conditioning compartment, or when harmful material or smell remains in return air from the exhaust port, harmful material or smell of a large volume of air which circulates in a building and passes through the air-conditioning compartment is sterilized or deodorized by a sterilizing/deodorizing device provided in the air-conditioning compartment, e.g., HEPA+deodorizing filter type, sodium hypochlorite type, plasma discharge type, corona discharge type, or ultraviolet radiation type+photocatalytic type device and therefore, a more safe, healthy and comfortable conditioning ventilation system is obtained.

Effect of the Invention

According to the present invention, small air volume exhausting operation in each room and each space, small air volume heat exchanging and ventilating operations in entire building, and large air volume of small temperature difference air-conditioning are usually appropriately carried out, and a good air quality, healthy and comfortable space of uniform temperature is realized with saved energy. When harmful material such as smell or bacteria flows in or is generated in any of rooms, ventilation air volume in this room is increased, the harmful material is discharged swiftly, the harmful material is prevented from dispersing from this room or air path to another space, large volume of air-conditioned air supplied to a room or space where the harmful material does not flow in or is not generated is again used for air-conditioning, and heat and air quality of return air are effectively utilized. Hence, it is possible to provide a more energy saved comfortable conditioning ventilation system.

By sterilizing or deodorizing large volume of mixed air for air-conditioning or ventilating, it is possible to provide a conditioning ventilation system which rationally and efficiently enhances air quality.

BRIEF DESCRIPTION OF DRAWINGS

FIG. 1 is a diagram showing a configuration of a conditioning ventilation system in a first embodiment of the present invention;

FIG. 2 are plan views and a vertical sectional view of a door having high airtightness, an exhaust port and an opening/closing mechanism of the system;

FIG. 3 are plan views and a vertical sectional view of the exhaust port directing to outdoor and the opening/closing mechanism of the system; and FIG. 4 is a diagram showing a configuration of a conditioning ventilation system in a second embodiment of the invention.

MODE FOR CARRYING OUT THE INVENTION

First Embodiment

FIG. 1 is a diagram showing a configuration of a conditioning ventilation system in a first embodiment of the present invention.

As shown in the drawing, a conditioning ventilation system 1 is placed in a building (not shown) which is a high airtightness and super-insulated residential house. The conditioning ventilation system 1 air-conditions and ventilates a plurality of rooms, a space other than the plurality of rooms, and a room other than the plurality of rooms which are separated into a plurality of spaces in the building. The plurality of rooms are a room A5, a room B6, a living room (not shown), a bed room (not shown), a toilet (not shown), a restroom (not shown), a bathroom (not shown), a kitchen (not shown) and the like. The space other than the plurality of rooms are a roof space (not shown), an under floor (not shown), a storeroom (not shown) and the like. The room other than the plurality of rooms are recuperation room 7, a smoking room (not shown) and the like. In this embodiment, the recuperation room 7 is a room where a sick person or a person in need of nursing care is treated, and a smoking room is a room dedicated for smoking. Rooms other than the other plurality of rooms are rooms where there is a probability that harmful amount or unpleasant amount harmful material or smell such as carbon dioxide, odor, volatile organic compound, bacteria, virus or the like of is generated.

In this embodiment, a room means a living room, a space means a non-living room, the living room means a room which is continuously used with intent to live, work in office, operate, meet or for recreation, the non-living room means a room which is different from the living room, and a room which is difficult to determine as a living room may be determined in accordance with a using state thereof.

The plurality of rooms and spaces which are air-conditioned or ventilated by the conditioning ventilation system 1 can individually be set in each of buildings.

An air-conditioning compartment 10 is provided in a non-living room such as a roof space (not shown), an under floor (not shown), an understair (not shown), a halfpace of stairs (not shown), a machine room (not shown) and the like. An outside air introducing port 11, air blowing sections 13, a return air port 14 and the air-conditioning section 15 are provided in an air-conditioning compartment 10. The outside air introducing port 11 introduces outdoor air. Each of the air blowing sections 13 includes a plurality of suction ports 12. The return air port 14 introduces, through a return air path such as a passage way (not shown) and a stairs room (not shown), return air flowing from the rooms A5 and B6 which are a plurality of rooms, a space (not shown) other than the plurality of rooms, the recuperation room 7 and the smoking room (not shown) which are other rooms other than the plurality of rooms. The air-conditioning section 15 is connected to an air-conditioning outdoor machine (not shown) placed outdoor through a refrigerant pipe and an electric wire.

The air-conditioning section 15 includes a heat exchanger (not shown) and an air blower (not shown), and each of the air blowing sections 13 includes a fan (not shown) and a motor (not shown).

In this embodiment, the air blowing section 13 in the air-conditioning compartment 10 is shared by the air blower (not shown) of the air-conditioning section 15, but if air blowing function for exchanging heat with the heat exchanger (not shown) and transferring function for sending wind to each space are effectively exhibited, the air blowing section 13 and the air blower have any configurations.

In this embodiment, the air-conditioning compartment 10 is a sealed air conditioning chamber covered with a wall and a heat insulating material, but the air-conditioning compartment 10 may be a compact casing covered with metal plate or heat insulating material. If outdoor air, return air, air before air conditioning and air after air conditioning are well mixed without shortcutting due to positional relation between the air-conditioning section 15 and the air blowing section 13, the air-conditioning compartment 10 may be partially opened stairs room, passage way or casing. However, it is preferable that the air-conditioning section 15 and the plurality of air blowing sections 13 have such sizes that a person can come in and out and maintenance can be carried out.

The plurality of air blowing sections 13 and a plurality of air-intake portions 16 are connected to each other through a plurality of ducts 17 or an air-blowing chamber (not shown) in a one-to-one relation. The plurality of air-intake portions 16 are provided on ceilings or walls of the rooms A5 and B6 which are the plurality of rooms, the living room, the bed room, the toilet, the restroom, the bathroom, the kitchen, the roof space, the under floor, the storeroom, the recuperation room 7 and the smoking room which are other rooms other than the plurality of rooms.

The plurality of air-intake portions 16 are provided also in the roof space, the under floor, the storeroom and the like. Mixed air is sent by the plurality of air blowing sections 13. This is because, even if a person does not stay in a certain space almost at all, if the entire building is air-conditioned by the mixed air, temperature of rooms in the entire building becomes uniform, movement of heat is small, energy is conversely saved to maintain a comfortable space. Especially spaces in the roof space and the under floor are large and face an outer wall of the building, a heat insulation degree becomes high in the building, and energy of air conditioning is saved.

The rooms A5 and A6, an exhaust port (exhaust means) 19 such as the undercut, and the exhaust port (exhaust means) 22 having the opening/closing mechanism 21 of the door 20 having high airtightness such as the recuperation room 7 join up with each other at the passage way, the stairs hall and the return air path such as entry, and the return air path is connected to the return air path 14 provided in the air-conditioning compartment 10.

The rooms A5 and A6 and the recuperation room 7 are provided with an exhaust port directing to outdoor (exhaust means directing to outdoor) 26 connected to the outdoor 25, and respectively include opening/closing mechanisms 27. It is preferable that the opening/closing mechanisms 21, 27 can at least completely close and open, and can adjust the opening/closing amount stepwisely or steplessly because the exhaust gas volume can finely be adjusted.

Openings of outer walls facing the outdoor 25 downstream of the exhaust port 26 directing to outdoor are respectively provided with outdoor hoods 29 capable of preventing rain, bird, bug, dust and the like from entering.

The roof space, the under floor, the storeroom and the like are not provided with the exhaust port 26. This is because that if a person does not stay almost at all and even if harmful material is generated or flows in, the harmful material is diluted if a certain amount of time is elapsed by circulation of mixed air by the air blowing section 13, and bacteria is eliminated and smell is deodorized by a sterilizing/deodorizing device 40.

The recuperation room 7 includes a ventilation fan 28 which discharges air to outdoor 25 into the exhaust port 26 directing to outdoor. When the exhaust port 26 is short and air resistance is small, the ventilation fan 28 may be attached to a window or a wall in which a propeller fan is rotated by an AC motor, but when the duct is long and air resistance is relatively large, it is preferable that the ventilation fan 28 is embedded in which a sirocco fan is rotated by a DC motor because a ventilation amount can finely be adjusted with saved energy.

An outdoor air introducing fan 30 which introduces outdoor air into the air-conditioning compartment 10 is connected to the outdoor 25 through the ducts 31, and is connected to the outside air introducing port 11 of the air-conditioning compartment 10 through the ducts 32. The outdoor air introducing fan 30 is provided therein with harmful material detecting means 33 of outdoor air, a HEPA filter 34 and a fan motor 35.

In this embodiment, the outdoor air introduction path which connects the outdoor 25 and the return air path is provided with the outdoor air introducing fan 30, but an opening/closing mechanism is provided instead of the outdoor air introducing fan 30. For example, if an opening/closing degree of the window connected to the outdoor 25 is adjusted by the opening/closing mechanism and outdoor air introducing volume is adjusted, an adjusting width is small and it is difficult to adjust precisely, but it is possible to easily adjust manually.

In this embodiment, the outdoor air introducing fan 30 is connected to the outdoor 25 through the ducts 31, and is connected to the air-conditioning compartment 10 through the ducts 32, but as a result, outdoor air is introduced into the air-conditioning compartment 10, and it is only necessary that mixed air in which air-conditioned air and return air from the rooms and the spaces is sent to the rooms and the spaces. For example, the outdoor air introducing fan 30 may be connected, through ducts, to return air paths such as a passage way, a stairs hall and entry located upstream of the return air port 14 of the air-conditioning compartment 10.

The harmful material detecting means 33 detects carbon dioxide, odor, volatile organic compound, virus and the like.

An upstream side of the ventilation fan 28 of the recuperation room 7 which is a room other than the plurality of rooms includes harmful material detecting means 36 of air in the recuperation room 7.

The air-conditioning compartment 10 is provided therein with the sterilizing/deodorizing device 40, and mixed air in which a large volume of outdoor air circulating in the building, return air which is air after air conditioning, and air-conditioned air are mixed in the air-conditioning compartment is sterilized and deodorized.

As the sterilizing/deodorizing device 40, there are HEPA+ deodorizing filter type device, sodium hypochlorite type a, plasma discharge type device, corona discharge type device, and ultraviolet radiation type+photocatalytic type device. The device may be selected in accordance with kind a degree of harmful material which should be eliminated, a shape of the device, a shape of the air-conditioning compartment 10, a wind speed of air in the air-conditioning compartment 10 and the like. When only harmful material must be eliminated and smell may not be eliminated, only a sterilizing device which is effective for eliminating target harmful material may be provided, or only deodorizing device which is effective for deodorizing target smell may be provided. For example, when virus of particle diameter of 0.1 μm or greater which can be captured by the HEPA filter should be eliminated and smell which can be deodorized by a deodorizing filter should be eliminated, these filters are detachably attached such that they are attached firmly to an inner side of the return air port 14 of the air-conditioning compartment 10. According to this, since all the return air which circulates in the building passes through the return air port 14, a large space is not required, and maintenance can be carried out if the return air port 14 is detached and the maintenance is easily carried out.

Although the sterilizing/deodorizing device 40 is provided in the air-conditioning compartment 10 in this embodiment, there is no difference in effect for sterilizing and deodorizing large volume of air in the building if the sterilizing/deodorizing device 40 is provided on the way to the return air path from the exhaust port 19 such as the undercut of the doors 18 of the room and the space and the exhaust port 22 of the door 20 having high airtightness such as the recuperation room 7 to the air-conditioning compartment 10.

However, in the case of the sterilizing/deodorizing device 40, it is necessary to regularly carry out cleaning and replacement of the filters, resupply of water and chemicals, cleaning, replacement and the like. Therefore, it is preferable that a place where the sterilizing/deodorizing device 40 is provided has such a size that a person can come in and out and can carry out operations like the air-conditioning compartment 10.

In FIG. 1, as rooms and spaces in the building, rooms and spaces other than the rooms A5 and A6 and recuperation room 7 are omitted, and the air blowing section 13, the air-intake portion 16, the ducts 17, the ducts 18, and the exhaust port 19 are also omitted correspondingly.

FIG. 2 are plan views and a vertical sectional view of the door having high airtightness, the exhaust port and the opening/closing mechanism of the system, wherein FIG. 2(*a*) shows a state where the opening/closing mechanism is closed, and FIGS. 2(*b*) and 2(*c*) show a state where the opening/closing mechanism is opened.

FIG. 2(*a*) shows a state where an opening/closing plate 41 of the opening/closing mechanism 21 provided in the exhaust port 22 of the door 20 having high airtightness such as the recuperation room 7 is closed and the exhaust port 22 is clogged. & The opening/closing plate 41 may steplessly be adjusted manually from 0° to 180°. The door 20 having high airtightness can be opened by frontward pulling a door knob located on a center of left side around a right hinge.

FIG. 2(*b*) shows a state where the opening/closing plate 41 of the door 20 having high airtightness is opened, and the exhaust port 22 is completely opened.

FIG. 2(*c*) is an enlarged vertical sectional view of FIG. 2 (*b*).

In FIGS. 2(*a*) and 2(*b*), an airtight seal and packing (not shown) (made of polypropylene, polyester, vinyl chloride, or EPDM rubber) are pasted on a door projection 44 provided on four portions of a gateway of a room or the like of the building in FIG. 2(*c*) on a door airtight portion 43 (shaded portion) around four portions of the door 20 having high airtightness. Four portions of the airtight seal, the packing and the door 20 having high airtightness are in surface contact with each other, and high airtightness when the door 20 having high airtightness is closed is maintained.

It is also possible to mount an airtight seal, a packing, a member or the like on four portions of a normal door to exhibit function of the door airtight portion 43, thereby enhancing airtightness. However, when the door is closed, if the airtight seal, the packing, the member or the like is not pasted in a direction to compress the airtight seal or the packing, if the opening and closing operations of the door are repeated, there is a possibility that airtightness is deteriorated.

In FIG. 2(a), an airtight seal and a packing (not shown) (made of polypropylene, polyester, vinyl chloride, or EPDM rubber) is pasted on an exhaust port projection 46 provided on four portions of the exhaust port 22 in FIGS. 2(b) and 2(c) on an exhaust port airtight portion 45 (shaded portion) around four portions of the exhaust port 22. In a state where the opening/closing plate 4 in FIG. 2(a) is closed, the airtight seal and the packing come into surface contact with four portions of the opening/closing plate 41, and high airtightness when the door is closed is maintained.

In FIG. 2(c), a left side of the door 20 having high airtightness is an inner side of another room (recuperation room 7 in first embodiment, and a plurality of rooms and room other than the plurality of rooms in second embodiment), and a right side of the door 20 is a passage way, a stairs hall, an entry or the like. If the opening/closing plate 41 is opened, the recuperation room 7 comes into communication with the passage way, the stairs hall and the entry and as a result, the recuperation room 7 comes into communication with the return air port 14 provided in the air-conditioning compartment 10. A large arrow shows a flowing direction of wind when the door 20 having high airtightness is opened, and small arrows show a rotation direction of the opening/closing plate 41. The door 20 having high airtightness is pulled toward inside of the left room and is opened.

In this embodiment, the shafts 42 are provided on both sides of a center of the one opening/closing plate 41, and the opening/closing plate 41 is opened and closed. Hence, the opening/closing plate 41 has a simple structure, air resistance when the opening/closing plate 41 is opened is small, and wind pressure on the opening/closing plate 41 when it is closed is uniform. Therefore, the opening/closing plate 41 is not easily opened on its own. When the opening/closing plate 41 is opened, since an opening of the exhaust port 22 is large, it is easy to put meal of the one undergoing medical treatment in and out in a room in a state where the door 20 having high airtightness is closed.

Instead of one opening/closing plate 41, if a plurality of small opening/closing plates are arranged and the shafts 42 are connected through a link and are opened and closed, projection amounts of the opening/closing plate 41 forward and backward of the exhaust port 22 are reduced, and beauty of external appearance thereof when the opening/closing plate 41 is opened is enhanced.

Although the door 20 having high airtightness is provided with the exhaust port 22 in this embodiment, a wall facing a passage way or the like may be provided with the exhaust port 22. In a state where the opening/closing plate 41 is opened, the exhaust port 22 provided on the wall joins up with another room (recuperation room 7 in first embodiment, and a plurality of rooms and room other than the plurality of rooms in second embodiment), the passage way, the stairs hall, the entry and the like, the exhaust port 22 comes into communication with the return air path and as a result, the exhaust port 22 may come into communication with the return air port 14 provided in the air-conditioning compartment 10.

Although the door 20 having high airtightness is provided with the exhaust port 22 in this embodiment, when the exhaust port 22 is not provided, a window which can be opened and closed is provided, and air volume of return air flowing into the return air path such as a passage way can be adjusted by manually adjusting an opening degree of the window. However, it is necessary to pay attention to a point that the window cannot be opened or closed manually, and to a point that high airtightness with a window frame in a state where the window is closed.

FIG. 3 are plan views and a vertical sectional view of the exhaust port directing to outdoor and the opening/closing mechanism of the system, wherein FIG. 3(a) shows a state where the opening/closing mechanism is closed, and FIGS. 3(b) and (c) show a state where the opening/closing mechanism is opened.

FIG. 3(a) shows a state where an opening/closing plate 47 of an opening/closing mechanism 27 of the exhaust port 26 directing to outdoor connected to the outdoor 25 is closed to 0°, and the exhaust port 26 directing to the outdoor is clogged.

FIG. 3(b) shows a state where the opening/closing plate 47 of the exhaust port 26 directing to outdoor is opened to 90°, and the exhaust port 26 directing to outdoor is completely opened.

FIG. 3(c) is an enlarged vertical sectional view of FIG. 3(b).

The opening/closing plate 47 can steplessly be adjusted around shafts 48 which are provided on the right and left sides from 0° (closed state) to 90° (opened state) by a motor (not shown) attached to the shafts 48. The opening/closing plate 47 may manually be adjusted steplessly from 0° to 180°.

In FIG. 3(a), an airtight seal or packing (not shown) (made of polypropylene, polyester, vinyl chloride, EPDM rubber or the like) is pasted on an exhaust port airtight portion 51 (hatched portion) around four portions of wooden frame 50 of the exhaust port 26 directing to outdoor. The airtight seal or the packing is pasted on an exhaust port projection 52 provided on inner four portions of the wooden frame 50 in FIG. 3(c). In a state where the opening/closing plate 47 in FIG. 3(a) is closed, the opening/closing plate 47 comes into surface contact with the airtight seal or the packing at four portions, and high airtightness when opening/closing plate 47 is closed is maintained.

In FIG. 3(c), a left side of the exhaust port 26 directing to outdoor is inner side of the rooms (rooms A5 and A6, recuperation room 7 and the like), and a right side of the exhaust port 26 is the outdoor 25. If the opening/closing plate 47 is opened, the rooms A5 and A6, the recuperation room 7 and the outdoor 25 come into communication with each other. A large arrow shows a flowing direction of wind when the opening/closing plate 47 is opened, and small arrows show a rotation direction of the opening/closing plate 47.

In this embodiment, the shafts 48 are provided on central both sides of the one opening/closing plate 47, and the opening/closing plate 47 is opened and closed. Hence, the opening/closing plate 47 has a simple structure, air resistance when the opening/closing plate 47 is opened is small, and wind pressure on the opening/closing plate 47 when it is closed is uniform. Therefore, the opening/closing plate 47 is not easily opened on its own.

Instead of one opening/closing plate 47, if a plurality of small opening/closing plates are arranged and the shafts 48 are connected through a link and are opened and closed, projection amounts of the opening/closing plate forward and backward of the exhaust port 26 directing to outdoor are reduced, and beauty of external appearance thereof when the opening/closing plate 47 is opened is enhanced.

Although the exhaust port 26 directing to outdoor is provided such that it penetrates the wall 55 facing the outdoor 25 in this embodiment, if it is no a room or a space facing the outdoor 25, an outdoor side of the exhaust port 26 directing to outdoor may be connected to an opening (not shown) directing to outdoor provided on a wall facing the outdoor 25 by a duct (not shown) or a chamber (not shown).

If a room facing the outdoor 25 has a window (not shown) and it is difficult to provide the exhaust port 26 directing to outdoor in another place and the opening/closing mechanism 27 cannot be placed in the window, the window is manually opened and closed, and exhaust gas volume which is discharged to outdoor can be adjusted by adjusting an opening degree of the window. However, the window cannot automatically be opened and closed, and attention should be paid to invasion of rain, bird, bug, dust and the like.

In FIG. 1, input and output means of the plurality of air blowing sections 13, the air-conditioning section 15, the opening/closing mechanisms 21 and 27, the ventilation fan 28, the outdoor air introducing fan 30, the harmful material detecting means 33 and 36, the sterilizing/deodorizing device 40 and the like are electrically connected to a control section 60 through a plurality of signal lines 61, they perform communication with each other, and appropriately control the conditioning ventilation system 1. In this embodiment, communication is performed in a wired system by the signal lines 61, but the air blowing sections 13, the air-conditioning section 15, the opening/closing mechanisms 21 and 27, the ventilation fan 28, the outdoor air introducing fan 30, the harmful material detecting means 33 and 36, the sterilizing/deodorizing device 40 may be provided with radio communications and they may perform communication in Wi-Fi (registered trade name), Bluetooth (registered trade name) or infrared rays, In the above-described configuration, if operation of the conditioning ventilation system 1 is started by a controller (not shown) connected to the control section 60, outdoor air is introduced from the ducts 31 by the outdoor air introducing fan 30, existence or non-existence, density, amount and the lie of harmful material (odor, bacteria and the like) are detected by the harmful material detecting means 33. The outdoor air is cleaned by the HEPA filter, the outdoor air passes through the ducts 32, and enters the air-conditioning compartment 10 from the outside air introducing port 11 through the duct 32.

Return air from each of the rooms and each of the spaces enters the air-conditioning compartment 10 from the return air port 14. Outdoor air and a portion of return air which is air after air conditioning are air-conditioned by the air-conditioning section 15, the air-conditioned air, the outdoor air and a portion of the return air are further mixed in the air-conditioning compartment 10 in large air volume by the plurality of air blowing sections 13. The mixed air is sterilized and deodorized by the sterilizing/deodorizing device 40, and the mixed air is sent by the plurality of air blowing sections 13 through the plurality of ducts 17. The mixed air blows out from the plurality of air-intake portions 16 provided in each of ceilings and walls of the rooms A5 and A6, the living room, the bed room, the toilet, the restroom, the bathroom, the kitchen, the roof space, the under floor, the storeroom, the recuperation room 7 and the like, and these rooms and the spaces are air-conditioned.

In the rooms A5 and A6, the opening/closing plate 47 of the opening/closing mechanism 27 of the exhaust port 26 directing to outdoor is opened to some extent, and a portion of air-conditioned air is discharged to outdoor 25 of each room by supplying the mixed air. A remaining portion of the air-conditioned air flows from the exhaust port 19 such as the undercut of the door 18 of each room to the return air paths such as the passage way, the stairs hall, the entry and the like, and returns to the air-conditioning compartment 10.

Blast volume of the mixed air from the air-intake portion 16 of each room is distributed to the exhaust gas volume directing to the outdoor 25 from the exhaust port 26 directing to outdoor of each room and to return air volume toward the return air path from the exhaust port 19. The exhaust gas volume to the outdoor 25 from the exhaust port 26 directing to outdoor of each room is determined by a pressure difference between the outdoor 25 and an opening cross-sectional area of the exhaust port 26 directing to outdoor by an angle of the opening/closing plate 47 of the opening/closing mechanism 27 which is opened to some extent. Return air volume from the exhaust port 19 toward the return air path is determined by an opening cross-sectional area of the exhaust port 19 and a pressure difference between a pressure difference of the passage way, the stairs hall and the entry.

In a normal state, exhaust gas volume adjusts the opening/closing plate 47 of each room such that the exhaust gas volume becomes small air volume in which minimum required 24 ventilated air volume as an entire building is distributed by an area of each room, remaining blast volume becomes most of return air volume, it returns from the exhaust port 19 to the air-conditioning compartment 10 as return air, and it is again air-conditioned and circulated to each room.

In the recuperation room 7 and the like, in a normal state, a level of harmful material detected by the harmful material detecting means 36 of the recuperation room 7 is lower than that of harmful material of outdoor air detected by the harmful material detecting means 33. Therefore, the control section 60 determines that the mode is the positive pressure mode. The opening/closing plate 41 is opened to 90°, the exhaust port 22 is completely opened, the opening/closing plate 47 is opened to some extent and the ventilation fan 28 is stopped. According to this, blast volume of the mixed air becomes greater than the exhaust gas volume of the exhaust port 26 directing to outdoor. Hence, a portion of air after air conditioning which becomes positive pressure as compared with the outdoor 25 is discharged to the outdoor 25 of the recuperation room 7. A remaining portion of the air-conditioned air joins up with the return air path such as the passage way, the stairs hall, the entry from the exhaust port 22 of the door 20 having high airtightness of the recuperation room 7, and the remaining portion of the air-conditioned air returns to the air-conditioning compartment 10.

Blast volume of the mixed air from the air-intake portion 16 of the recuperation room 7 is distributed to exhaust gas volume to the outdoor 25 from the exhaust port 26 directing to outdoor, and to the return air volume from the exhaust port 22 to the return air path, and these air volumes are determined based on the same idea as the normal states of the rooms A5 and A6 and distributed.

The return air in the return air path with which the exhaust ports 19 and 22 join up is sucked into the air blowing section 13. Therefore, pressure becomes negative pressure as compared with the outdoor 25. Hence, even if the outdoor air introduction path which connects the outdoor 25 and the return air path to each other is not provided with the outdoor air introducing fan 30 as in this embodiment, if the opening/closing mechanism (not shown) is provided instead and the opening/closing mechanism is adjusted, outdoor air introducing volume can be adjusted. For example, the outdoor air introducing volume can be adjusted by adjusting an opening/closing degree of the window which is connected to outdoor, or by adjusting an opening/closing damper which is provided in an opening connected to outdoor. However, as compared with adjustment made by the outdoor air introducing fan, an adjusting width is small, and it is difficult to precisely adjust.

Return air which is air after air conditioning is again air-conditioned in the air-conditioning compartment 10, and the return air is supplied to each room and each space. Therefore, heat and air quality of the return air which is air after air conditioning are reutilized and as a result, energy is saved.

When a person infected with virus heals in the recuperation room 7, or when a person smokes in the smoking room, a level of harmful material detected by the harmful material detecting means 36 such as the recuperation room 7 or the like becomes higher than that of harmful material of outdoor air detected by the harmful material detecting means 33, and the control section 60 determines that the mode is the negative pressure mode. The opening/closing plate 41 is closed to 0°, the exhaust port 22 is completely closed, the opening/closing plate 47 of the opening/closing mechanism 27 of the exhaust port 26 directing to outdoor is opened to 90°, and the exhaust port 26 directing to outdoor is completely opened. In this state, the ventilation fan 28 is operated in large air volume. According to this, exhaust gas volume of the exhaust port 26 directing to outdoor becomes greater than the blast volume of mixed air in the recuperation room 7 or the like, and pressure becomes negative pressure as compared with the outdoor 25. All of air after air conditioning which is supplied from the exhaust port 26 directing to outdoor of the recuperation room 7 by the ventilation fan 28 is discharged to the outdoor 25, and harmful material (odor, bacteria and the like) in the recuperation room 7 is discharged to the outdoor 25. Further, attempt is made to suck air in other room and other space from fine gaps of the door, window, the wall and the like of the recuperation room 7, and to discharge the air to the outdoor 25. However, the harmful material does not flow out into the return air path such as the passage way, the stairs hall, the entry and the like by the door 20 having high airtightness and the opening/closing mechanism 21 of the exhaust port 22 having high airtightness. That is, harmful material is swiftly discharged to the outdoor 25, and a risk that the harmful material is dispersed to another room is largely reduced.

When the negative pressure mode continued for determined time and a level of harmful material detected by the harmful material detecting means 36 such as the recuperation room 7 is reduced from the original value and becomes lowered than an initial level but a certain threshold value and the level of the harmful material detected by the harmful material detecting means 36 is greater than a level of harmful material of outdoor air, the control section 60 determines that the mode is balance mode, and the exhaust gas volume of the exhaust port 26 directing to outdoor by the ventilation fan 28 is reduced to the same value as the blast volume of mixed air. Hence, harmful material is discharged and a risk that the harmful material is dispersed to another room and another space is reduced and the exhaust gas volume to outdoor and heat quantity are appropriately reduced. Therefore, air conditioning load is reduced as compared with the negative pressure mode and energy is saved.

When there is no ventilation fan 28 or when the system is not operated due to trouble or the like in the negative pressure mode or balance mode, pressure in the room becomes positive pressure by supply of mixed air. Since the exhaust port 26 directing to outdoor is completely opened, exhaust gas volume of the exhaust port 26 directing to outdoor and blast volume of mixed air become equal to each other, and harmful material in the room can be discharged. Concerning flowing out of harmful material to the passage way, the stairs hall and entry whose pressure is negative pressure, since the door 20 having high airtightness and the opening/closing mechanism 21 of the exhaust port 22 having high airtightness are completely closed and thus, a risk is reduced.

In the positive pressure mode, exhaust gas volume from the exhaust port 26 directing to outdoor and return air volume from the exhaust ports 19 and 22 are controlled by adjusting an angle of the opening/closing mechanism 27 of the exhaust port 26 directing to outdoor such as the rooms A5 and A6, the recuperation room 7 and the like. That is, the control section 60 controls such that temperature becomes comfortable temperature with saved energy corresponding to air conditioning load of each room by adjustment of exhaust gas volume by the angle of the opening/closing plate 47 of the opening/closing mechanism 27 of each room, adjustment of return air volume, adjustment of outdoor air introducing volume by the fan 30, and adjustment of blast volume by the air blowing section 13.

In the roof space and the like, pressure becomes positive pressure as compared with the outdoor 25 by blowing of mixed air, but since there is no exhaust port directing to outdoor, all of return air which is after air conditioning passes through the return air path such as the passage way, the stairs hall, the entry and the like from the exhaust port 19, and the return air returns to the air-conditioning compartment 10.

Blast volume of each of the air blowing sections 13 is determined from volume of each room and each space. It is preferable that blast volume required for air conditioning is at least 8 m$^3$/h or more per a room 2.5 m$^3$ and ideally, 20 m$^3$/h or more, and the blast volume is adjusted based on a size of the room and air conditioning load such as solar insolation. Since the air blowing section 13 rotates the sirocco fan (not shown) by an efficient DC motor (not shown), the control section 60 controls the number of rotations of the sirocco fan by air conditioning load or the like.

The air-conditioning section 15 selects ability and the number based on the air conditioning load of the building.

In the air-conditioning compartment 10, fresh outdoor air introduced by the outdoor air introducing fan 30, air-conditioned air which is air-conditioned by the air-conditioning section 15, and return air from each room and each space are reliably mixed. It is preferable that air volume of the air-conditioning section 15 becomes equal to or less than 50% of total blast volumes of the plurality of air blowing sections 13 so that mixed air has a temperature difference of 5K or less at the time of cooling operation and 10K or less at the time of heating operation with respect to uniform temperature having small temperature difference between the rooms and spaces, i.e., target temperature of the rooms and spaces.

Air conditioning is carried out such that temperature of the rooms and spaces becomes uniform comfortable temperature by sending the mixed air from the air-intake portions 16 provided ceiling or walls of the rooms and spaced through the plurality of ducts 17 by the plurality of air blowing sections 13.

For example, when a floor area of the building is about 100 m$^2$ and a ceiling height is 2.5 m, air-conditioning section 15 having cooling ability of 4 kW is placed, and air conditioning air volume at the time of cooling operation in a weak wind mode becomes 700 m³/h. In the air blowing section 13 which sends wind to each room and each space, blast volume per one air blowing section is about 100 m³/h in weak air volume, about 150 m³/h in medium air volume, and 200 m³/h in strong air volume. A total blast volume when fifteen air blowing sections 13 are provided, a total blast volume is about 1500 to 3000 m³/h, this air volume is larger than air conditioning air volume of the air-conditioning section 15, and air volume of 23 to 47% of the total blast volume is set as air conditioning air volume (weak wind mode) of the air-conditioning section 15.

Air-conditioned air volume is volume of air which passes through a heat exchanger (not shown) of the air-conditioning section 15. To avoid pressure loss by passing through the heat exchanger so that large volume of air-conditioned mixed air can be blown out into each room, when the air-conditioning section 15 has a wind path for bypassing the heat exchanger, air volume of the bypass wind path is eliminated from the air-conditioned air volume.

As outdoor air introducing volume introduced by the outdoor air introducing fan 30, as a total exhaust gas volume from the exhaust port 26 directing to outdoor, and as so-called return air volume, when a floor area is about 100 m² and a ceiling height is 2.5 m and the number of ventilation operations is 0.5/h in the positive pressure mode, ventilation air volume for 24 hours is 125 m³/h. When harmful material is generated and flows in, in the negative pressure mode, since exhaust gas volume of the ventilation fan 28 in that room is increased by about 150 m³/h, outdoor air introducing volume is also increased by 300 m³/h or more in air volume, and supplying and discharging balance of the entire building is maintained. In the balance mode, the air volume is set to about 150 to 250 m³/h.

As the outdoor air introducing volume introduced into the air-conditioning compartment 10 by the outdoor air introducing fan 30 is greater, fresh air is supplied, and effect as ventilation is greater. However, since air conditioning load is increased correspondingly, it is made smaller than a total blast volume of the air blowing section 13 basically, and 24 hours ventilation air volume is normally secured at a minimum. When harmful material is generated and flows in, it is preferable that outdoor air introducing volume is increased by an increased amount of exhaust gas volume from the exhaust port 26 from outdoor of that room.

It is preferable that exhaust gas volumes of the plurality of rooms and spaces are discharged in accordance with capacity of the rooms and spaces and the number of persons staying in the room, but the exhaust gas volumes are about 10 to 30 m³/h in the normal positive pressure mode, and the control section 60 adjusts an angle of the opening/closing plate 47 such that exhaust gas volume from the exhaust port 26 directing to outdoor becomes about 10 to 30 m³/h. If the exhaust gas volume in the entire building is maintained appropriately, it is possible to discharge normal moisture, carbon dioxide, odor, VOC and the like, and healthy and comfortable air conditioning can be realized with saved energy.

When harmful material is generated and flows into the recuperation room 7, the ventilation fan 28 is operated such that the exhaust gas volume of the recuperation room 7 becomes 150 to 200 m³/h in the negative pressure mode, exhaust gas volumes in other rooms and spaces are maintained at the same air volume as in the positive pressure mode. According to this, it is possible to swiftly discharge harmful material in the recuperation room 7 and to discharge moisture and carbon dioxide in the entire building at minimum. In this case, exhaust gas volume of the recuperation room 7 is increased and heat quantity of the air-conditioned air is also discharged. Therefore, it is preferable to simultaneously increase blast volume of the air blowing section 13 of the recuperation room 7 correspondingly, lower set temperature of the air-conditioning section 15 at the time of cooling operation, and increase the set temperature at the time of heating operation.

In the balance mode, exhaust gas volume of the recuperation room 7 is set to 30 to 150 m³/h, total exhaust gas volume in other rooms and spaces is maintained at the same air volume as in the positive pressure mode. Since heat quantity of air-conditioned air is also discharged, it is preferable to control blast volume and set temperature based on the same idea as the negative pressure mode.

To obtain the above-described air volumes, the control section 60 controls blast volumes of the plurality of air blowing sections 13, set temperature and air-conditioned air volume of the air-conditioning section 15, angles of the opening/closing plates 41 and 47 of the opening/closing mechanisms 21 and 27, exhaust gas volume of the ventilation fan 28, outdoor air introducing volume of the outdoor air introducing fan 30, and the like.

It is described in this embodiment that the air-conditioning section 15 is the heat exchanger (not shown), the heat exchanger and the air conditioning air blower (not shown) are accommodated in an integral casing as an air conditioning indoor unit, the air blowing sections 13 are described as so-called air blowers, and the air-conditioning compartment 10 is described as a relatively compact room of about 3.3 m³ (1 tsubo) whose four sides are surrounded by heat insulation walls. However, the air-conditioning compartment 10 is made as a casing surrounded by metal plates, only a heat exchanger is provided in the casing as the air-conditioning section 15, and a plurality of air blowers are provided as the air blowing sections 13. Outdoor air and return air pass through the heat exchanger by the plurality of air blowers to form air-conditioned air, outdoor air and return air bypass the heat exchanger and do not pass through the heat exchanger, and the outdoor air, the return air and air-conditioned air are mixed in the casing to form mixed air. The mixed air may be sent to each room and each space. In this case also, it is preferable that the air-conditioning section 15, the plurality of air blowing sections 13 and the sterilizing/deodorizing device 40 have such sizes that a person can come in and out and maintenance can be carried out.

In this embodiment, wind is sent from the air blowing sections 13 to the rooms and spaces through the plurality of ducts 17 in the one-to-one relation, but in the case of a wide LDK of a first floor, blast volume in several ducts may collectively be sent through air-blowing chamber defined by architectural material. Instead of directly sending wind to each room and each space, wind may be sent to the room and the space through a space under the roof or a space under floor or stairs zone. To enhance temperature distribution in a room, a plurality of air-intake portions 16 having a wide room space may be provided. To avoid a risk that harmful material is dispersed to another room or another space, ducts 17 to a room other than the plurality of rooms, e.g., the recuperation room 7 or the smoking room are absolutely provided in a one-to-one relation with respect to the air blowing sections 13. When the plurality of air-intake portions 16 are connected to the ducts 17, it is necessary that the air-intake portions 16 do not stride another room or another space, and they are provided in the same room or the same space. In this case also, since all of the air blowing sections 13 and ducts 17 are not provided in the one-to-one relation, it is not possible to individually control the blast volume of the air-intake portion 16 existing ahead of the ducts 17, and it is difficult to handle the air conditioning loads of the rooms and spaces provided with the air-intake portion 16.

Since the air-conditioning compartment 10 has the sterilizing/deodorizing device 40, harmful material included in outdoor air is sterilized or deodorized of course. When harmful material is generated and flows in the recuperation room 7 and the harmful material is not discharged by the ventilation fan 28, and even if the harmful material flows out from the door 20 having high airtightness to the passage way, the stairs hall or the entry and the harmful material flows into the air-conditioning compartment 10 from the return air port 14 through the return air path, since the harmful material is sterilized and deodorized, it is possible to prevent the harmful material from being dispersed by sending wind to another room or another space.

It is not always necessary that the sterilizing/deodorizing device 40 has both the sterilizing function and the deodorizing function, and when it is necessary to eliminate only harmful material having high risk and smell need not be eliminated, only a sterilizing device which is extremely effective for eliminating the harmful material may be provided. For example, especially to prevent infection of new virus whose frequency of generation is increased in recent years for example, the following methods are effective.

That is, according to guide line of Centers for Disease Control and Prevention (CDC (2003)), as reference of ventilation of healthcare center (negative pressure facility) which separates patient with an infectious disease, the following methods are effective.
- A) The number of ventilation operations exceeds 12 times per hour (new building), or 6 times per hour (existing building),
- B) Discharge exhaust gas to outdoor, or circulate exhaust gas using high-efficiency particle filter (HEPA filter) Filter (HEPA filter), Showing (Ministry of Health, Labour and Welfare, home page, reference material, concerning ventilation to improve "confined space of poor ventilation" in commercial facility, pages 1 to 2, Mar. 30, 2020). As infection prevention measures of infection hospital ward, it is said that there is effect to provide the HEPA filter in an air circulation path. As one example of the embodiment, in the case of a building having a floor area of about 100 m² and a ceiling height of 2.5 m, in order to carry out ventilation and air conditioning in each room or each space with saved energy at uniform temperature, if a total blast volume for sending air to the room or the space is 1500 m³/h, the number of circulation operations is 6 times/h, and if the total blast volume is increased to 3000 m³/h, the number of circulation operations becomes 12 times/h. Hence, if the HEPA filter is used as the sterilizing/deodorizing device 40, the reference of CDC is satisfied. Generally, the HEPA filter has large ventilation resistance, and if large air volume passes through the filter, performance of the air blower (P-Q or the like) must be enhanced largely, and noise is also increased. However, in this embodiment, wind is sent by the plurality of air blowing sections 13, e.g., fifteen air blowing sections 13 and air is circulated in the building, enhancement of performance of one air blowing section 13 is moderated. The blast volume of one air blowing section 13 can easily be increased by increasing the number of rotations of the DC motor of the air blowing section 13, increased amount of consumed electric power is small as compared with A motor, a total blast volume can be increased efficiently with saved energy, and air in the building can be sterilized.

Further, if a size of the return air port 14 of the air-conditioning compartment 10 is set such that passing wind speed of the HEPA filter becomes 1 m/s or less, increase in noise can be suppressed. It is relatively easy to enlarge the air-conditioning compartment 10 if there is a sufficient space in the building.

Normally, it is necessary to periodically perform maintenance of the sterilizing/deodorizing device 40 irrespective of type of the device 40 and therefore, if a wide air-conditioning compartment 10 is provided in the device so that a person can come in and out for the maintenance, maintenance can be performed easily, and since a cross-section area of the air-conditioning compartment 10 is larger than that of the duct 17 and passing flow speed of air is slow and therefore, cleaning efficiency of the sterilizing/deodorizing device 40 is enhanced.

As described above, another room other than the plurality of rooms, e.g., a room where a possibility of generation and inflow of harmful material or smell is high such as the recuperation room 7 and the smoking room is provided with the exhaust port 22 including the door 20 having high airtightness and the opening/closing mechanism 21. Normally, in the positive pressure mode, return air which is air obtained by air conditioning each room and each space flows into the air-conditioning compartment 10 from the exhaust port 19 such as the room A5 and the roof space which are the plurality of rooms, and from the exhaust port 22 such as the recuperation room 7. The return air is air-conditioned by the air-conditioning section 15 together with outdoor air introduced by the outdoor air introducing fan 30, and the return air becomes mixed air of the outdoor air, the air-conditioned air and the return air, and the mixed air is sterilized and deodorized by the sterilizing/deodorizing device 40. The mixed air passes directly through the duct 17 by the plurality of air blowing sections 13 and the mixed air is sent from the air-intake portions 16 of each room and each space. Pressure in each room becomes positive pressure as compared with outdoor, the air in the room is replaced with mixed air, the air is discharged to outdoor from the exhaust port 26 directing to outdoor, a portion of air after air conditioning returns to the air-conditioning compartment 10 from the exhaust ports 19 and 22 as return air. When harmful material flows in or is generated in another room other than the plurality of rooms, the harmful material is swiftly discharged to the outdoor 25 by the ventilation fan 28 in the negative pressure mode or the balance mode, and a risk that the harmful material or smell is dispersed to another room is low. Air conditioning corresponding to a load of the room can be carried out in the plurality of rooms by adjusting blast volume from the air-intake portion 16 by the air blowing section 13, return air volume from the exhaust port 19 and exhaust gas volume from the exhaust port 26 directing to outdoor, and heat and air quality of a portion of air after air conditioning are reutilized for air conditioning as return air. Therefore, it is possible to realize more energy saving and efficient air conditioning and ventilation.

Outdoor air, air which is air-conditioned by the air-conditioning section 15 and return air are well mixed by total blast volume of the air-conditioning section 15 by the plurality of air blowing sections 13 which is greater than air-conditioned air volume of the air-conditioning section 15 by the plurality of air blowing sections 13 and outdoor air introducing volume of the outdoor air introducing fan 30, and the air is sterilized and deodorized by the sterilizing/deodorizing device 40. Since large volume of fresh air having a small temperature difference between outdoor air temperature and average room temperature is sent to the rooms, it is possible to realize uniform temperature, comfortable and air-cleaned heathy space can be realized in the rooms. By driving a compressor or the like of the air-conditioning outdoor machine, total blast volume having lower running cost per unit air volume and smaller air conditioning load than air-conditioned air volume having high running cost per unit air volume and outdoor air introducing volume having large air conditioning load per unit air volume is increased, and this system circulates mixed air having excellent air quality in the building and thus, energy is saved.

Second Embodiment

FIG. 4 is a diagram showing a configuration of a conditioning ventilation system in a second embodiment of the present invention. A conditioning ventilation system 100 shown in FIG. 4 has basically the same configuration as the conditioning ventilation system 1 of the first embodiment. To simplify the description, the same symbols are allocated to the same constituent elements, description, explanatory note and proviso thereof are omitted, and partial constituent elements are omitted. Like FIG. 1, arrows show flowing directions of wind.

A non-living room such as a roof space (not shown), an under floor (not shown), understair (not shown), a halfpace of stairs (not shown) and a machine room (not shown), is provided with an air-conditioning compartment 10. The air-conditioning compartment 10 is provided therein with an outside air introducing port 11, air blowing sections 13, a return air port 14 and an air-conditioning section 15. The outside air introducing port 11 introduces outdoor air. Each of the air blowing sections 13 includes a plurality of suction ports 12. The return air port 14 introduces return air from rooms A5 and A6 which are a plurality of rooms, a space (not shown) other than the plurality of rooms, and the recuperation room 7 which is another room other than the plurality of rooms through a return air path such as a passage way (not shown) and a stairs hall (not shown). The air-conditioning section 15 is connected to an air-conditioning outdoor machine 117 through a refrigerant pipe and electric wire.

The plurality of air blowing sections 13 and a plurality of air-intake portions 16 are connected to each other in the one-to-one relation through a plurality of ducts 17 or an air-blowing chamber (not shown). The plurality of air-intake portions 16 are provided in ceilings or walls of a plurality of rooms such as the rooms A5 and A6, a living room, a bed room (not shown), a toilet (not shown), a restroom (not shown), a bathroom (not shown) and a kitchen (not shown), spaces other than the plurality of rooms such as a roof space (not shown), an under floor (not shown) and a storeroom, and other rooms other than the plurality of rooms such as a recuperation room 7 and a smoking room (not shown).

An exhaust port (not shown) such as an undercut of a door (not shown) and an exhaust port 22 having an opening/closing mechanism 21 of a door 20 having high airtightness provided in the rooms A5, A6 and the recuperation room 7 are in communication with the return air port 14 provided in the air-conditioning compartment 10. Return air flows to the passage way (not shown), the stairs hall (not shown), the entry (not shown) and the like through the return pass.

The rooms A5 and A6, the recuperation room 7 and the like are provided with exhaust ports 26 connected to an outdoor 25 and directing to outdoor, and are provided with opening/closing mechanisms 27. The opening/closing mechanisms 21 and 27 can at least completely close and open. It is preferable that opening/closing amounts of the opening/closing mechanisms 21 and 27 can be adjusted in a stepwise manner or steplessly because exhaust gas volume can finely be adjusted.

The roof space (not shown), the under floor (not shown), the storeroom (not shown) and the like are not provided with the exhaust ports 26 directing to outdoor.

The recuperation room 7 and the like includes ventilation fans 28 which discharges air to outdoor.

An air-intake port 115 introduces outdoor air into a building, and the air-intake port 115 is provided in an outer wall 114. The air-intake port 115 is connected to a filter box 120 and a heat exchanging unit 130 through the duct 31 and the air-intake port 115 is also connected to an outdoor air introducing port 11 of the air-conditioning compartment 10 through a duct 32. A wind path from the air-intake port 115 to the outside air introducing port 11 is defined as an outdoor air introduction path. The filter box 120 includes a HEPA filter 34 which cleans outdoor air, and harmful material detecting means 33 of outdoor air.

In this embodiment, the heat-exchanging ventilating unit 130 is connected to the outdoor 25 through the duct 31, and is connected to the air-conditioning compartment 10 through the duct 32, but as a result, outdoor air which heat-exchanges with a portion of return air is introduced into the air-conditioning compartment 10, and it is only necessary that mixed air in which air-conditioned air and return air are mixed is sent to the rooms and the spaces. For example, the outside air introducing port 11 may be provided in a return air path such as a passage way, a stairs hall, an entry and the like located upstream of the return air port 14 of the air-conditioning compartment 10 and downstream of the duct 110 connected to a discharging side of the heat-exchanging ventilating unit 130, and the outside air introducing port 11 may be connected to an air-supply side of the heat-exchanging ventilating unit 130 through a duct or the like.

The heat-exchanging ventilating unit 130 includes a total heat exchanging element 131, an air-supply fan (not shown), an air-supply motor (not shown), an exhaust fan (not shown), an exhaust motor (not shown) and a bypass damper. Outdoor air is supplied by the air-supply fan and the air-supply motor, a portion of return air in the building is discharged by the exhaust fan and the exhaust motor, heat is totally exchanged by the total heat exchanging element 131, and heat-recovered fresh outdoor air is introduced into the air-conditioning compartment 10 through the duct 32. The number of rotations of each of the air-supply motor and the exhaust motor is individually controlled, and outdoor air introducing volume and exhaust gas volume can be adjusted. The bypass damper is operated by a motor. It is possible to switch between a bypass mode for bypassing exhaust gas directing to outdoor by the bypass damper without through the total heat exchanging element 131 and a heat-exchanging/ventilating mode for passing exhaust gas through the total heat exchanging element 131.

The heat-exchanging ventilating unit 130 and a return air path from each room and each space connected to the return air port 14 provided in the air-conditioning compartment 10 from the passage way, the stairs hall and the entry are connected to each other through a duct 110, and they are connected, through a duct 111, to an exhaust port 116 provided in the outer wall 114. A wind path from the return air path to the exhaust port 116 through the duct 110 is defined as an indoor air discharging path. That is, the outdoor air introduction path connected to the return air path and the indoor air discharging path are provided with the heat-exchanging ventilating unit 130.

The exhaust port 116 is provided on a suction side of the heat exchanger (not shown) of the air-conditioning outdoor machine 117. A partition wall 118 is provided between the air-conditioning outdoor machine 117 and the outer wall 114 such that exhaust air from the exhaust port 116 is sucked into the heat exchanger without leakage.

Harmful material detecting means 36 of air of the rooms is provided also upstream of the ventilation fan 28 and the exhaust ports 26 directing to outdoor of the rooms A5 and A6 and the recuperation room 7.

Input and output means of the plurality of air blowing sections 13, the air-conditioning section 15, the opening/closing mechanisms 21 and 27, the ventilation fan 28, the heat-exchanging ventilating unit 130, the harmful material detecting means 33 and 36, and the sterilizing/deodorizing device 40 are electrically connected to a control section 160, communication is performed, and the conditioning ventilation system 100 is appropriately controlled.

In the above-described configuration, if operation of the conditioning ventilation system 100 is started by a controller (not shown) connected to the control section 160, outdoor air is introduced from the air-intake port 115 and the duct 31 by the heat-exchanging ventilating unit 130, the outdoor air enters the filter box 120, and existence or non-existence/density/amount and the like of harmful material (odor, bacteria and the like) of the outdoor air are detected by the harmful material detecting means 33. The outdoor air is cleaned by the HEPA filter 34, the outdoor air passes through the duct, the outdoor air is totally heat exchanged with a portion of return air in the building by the heat-exchanging ventilating unit 130, and fresh outdoor air which recovered heat enters the air-conditioning compartment 10 from the outside air introducing port 11 through the duct 32.

A portion of return air from each room and each space enters the air-conditioning compartment 10 from the return air port 14. The outdoor air and the portion of the return air are air-conditioned by the air-conditioning section 15, the air-conditioned air and the portion of the return air are further mixed with each other in the air-conditioning compartment 10. The mixed air is sterilized and deodorized by the sterilizing/deodorizing device 40, and the mixed air is sent by the plurality of air blowing sections 13 through the plurality of ducts 17. The mixed air blows out from the plurality of air-intake portions 16 provided in each of ceilings and walls of the rooms A5 and A6, the living room, the bed room, the toilet, the restroom, the bathroom, the kitchen, the roof space, the under floor, the storeroom, the recuperation room 7, the smoking room and the like, and these rooms and the spaces are air-conditioned.

In a normal state, a level of harmful material detected by the harmful material detecting means 36 of the rooms such as the rooms A5 and A6 and the recuperation room 7 is lower than a level of harmful material of outdoor air detected by the harmful material detecting means 33. Therefore, the control section 160 determines that the mode is a positive pressure mode. The opening/closing plate 41 is opened to 90°, the exhaust port 22 is completely opened and the ventilation fan 28 is stopped. The opening/closing plate 47 of the opening/closing mechanisms 27 of the exhaust ports 26 directing to outdoor is closed to 0°, the exhaust ports 26 directing to outdoor is completely closed and mixed air is sent to each room. Therefore, pressure in each room becomes positive pressure, and air after air conditioning flows, through the passage way, the stairs hall, the entry and the like, from the exhaust port 22 into the return air path connected to the return air port 14.

A portion of return air returns from the return air port 14 to the air-conditioning compartment 10, the portion of return air is again air-conditioned and is supplied to each room and each space. Therefore, heat and air quality of air after air conditioning are reutilized and as a result, energy is saved.

Remaining portion of the return air passes through the duct 110, the portion of the return air are totally heat exchanged with outdoor air in the total heat exchanging element 131 by the heat-exchanging ventilating unit 130, the return air is discharged to the outdoor 25 from the exhaust port 116 provided in the outer wall 114, heat of air after air conditioning is recovered, fresh outdoor air is introduced into the building, and the air after air conditioning is discharged to the outdoor 25. Therefore, it is possible to always realize further energy saved, healthy and comfortable space.

When a person infected with virus heals in the recuperation room 7, or when a person smokes in the smoking room, a level of harmful material detected by the harmful material detecting means 36 becomes higher than that of harmful material of outdoor air detected by the harmful material detecting means 33, and the control section 160 determines that the mode is the negative pressure mode. The opening/closing plate 41 is closed to 0°, the exhaust port 22 is completely closed, the opening/closing plate 47 of the opening/closing mechanism 27 of the exhaust port 26 directing to outdoor is opened to 90°, the exhaust port 26 directing to outdoor is completely opened, and the ventilation fan 28 is operated in large air volume. According to this, since exhaust gas volume of the exhaust port 26 directing to outdoor is greater than blast volume of mixed air to the recuperation room 7, pressure becomes negative pressure as compared with the outdoor 25. All of air after air conditioning which is supplied from the exhaust port 26 directing to outdoor of the recuperation room 7 by the ventilation fan 28 is discharged to the outdoor 25, and harmful material (odor, bacteria and the like) in the recuperation room 7 is discharged to the outdoor 25. Further, attempt is made to suck air in other room and other space from fine gaps of the door, window, the wall and the like of the recuperation room 7, and to discharge the air to the outdoor 25. However, the harmful material does not flow out into the passage way, the stairs hall, the entry and the like by the door 20 having high airtightness and the opening/closing mechanism 21 of the exhaust port 22 having high airtightness. That is, harmful material is swiftly discharged to the outdoor 25, and a risk that the harmful material is dispersed to another room is largely reduced.

Harmful material is not generated and flows in in other rooms, a level of harmful material detected by the harmful material detecting means 36 is lower than that of harmful material of outdoor air detected by the harmful material detecting means 33. Therefore, the control section 160 determines that the mode is the positive pressure mode.

When outdoor air temperature is close to indoor target temperature between periods of spring or fall or at night in summer, the air-conditioning section 15 is stopped, the heat-exchanging ventilating unit 130 is brought into a bypass mode, and the number of rotations of the air-supply motor is adjusted to a large air volume side. Outdoor air and discharged return air do not heat-exchange in the total heat exchanging element 131, and the outdoor air is introduced into the air-conditioning compartment, and wind is sent to the air-intake portions 16 of the rooms by the air blowing sections 13. The opening/closing plate 41 of the opening/ closing mechanism 21 of the exhaust port 22 in each room is closed, adjustment is made to open an angle of the opening/closing plate 47 of the opening/closing mechanisms 27 of the exhaust ports 26 directing to outdoor, and air volume of the ventilation fan 28 is adjusted toward large air volume side. According to this, since each room is air-conditioned and ventilated by the outdoor air, it is possible to realize efficient ventilation air-conditioning with saved energy.

When special smell is generated in a room where there is no ventilation fan 28 such as the room A5, if a level of harmful material detected by the harmful material detecting means 36 becomes a little bit higher than that of harmful material of outdoor air detected by the harmful material detecting means 33, the control section 160 determines that the mode is the balance mode. The opening/closing plate 41 of the room A5 is close to 0°, the exhaust port 22 is completely closed, the opening/closing plate 47 is opened to 90° and the exhaust ports 26 directing to outdoor is completely opened. According to this, harmful material is discharged to the outdoor 25 by sending mixed air such that the harmful material is pushed out, and the exhaust gas volume of the exhaust ports 26 directing to outdoor is made substantially equal to blast volume of mixed air. Concerning outflow of harmful material to the passage way, the stairs hall, the entry and the like where pressure is negative pressure, since the door 20 having high airtightness and the opening/closing mechanism 21 of the exhaust port 22 having high airtightness are completely closed, the risk is lowered. Exhaust gas volume to outdoor and heat quantity are also appropriately reduced, air conditioning load is reduced as compared with the negative pressure mode, and energy is saved.

Discharged air having total heat which is not recovered by the heat-exchanging ventilating unit 130 from the exhaust port 116 and the outdoor air join up with each other, and they are sucked into the heat exchanger of the air-conditioning outdoor machine 117 by the partition wall 118. That is, in summer, even if cooled indoor air (a portion of return air, discharged air) and outdoor air heat-exchange in the heat-exchanging ventilating unit 130, only 50 to 70% can be heat exchanged normally even by total heat. Therefore, discharged air having smaller total heat than the outdoor air is discharged from the exhaust port 116. The discharged air and the outdoor air join up with each other, they become air having smaller total heat than outdoor air, the air passes through the heat exchanger which is a condenser, and the air totally heat-exchanges with refrigerant. In winter, even if heated indoor air (a portion of return air, discharged air) and outdoor air heat-exchange in the heat-exchanging ventilating unit 130, only 60 to 80% can be heat exchanged normally even by total heat. Therefore, discharged air having greater total heat (temperature and moisture are high) than the outdoor air is discharged from the exhaust port 116. The discharged air and the outdoor air join up with each other, they become air having greater total heat than outdoor air, the air passes through the heat exchanger which is a condenser, and the air totally heat-exchanges with refrigerant.

As described above, the exhaust port 116 which discharges discharged air discharged from the heat-exchanging ventilating unit 130 into the outdoor 25 is provided on the suction side of the heat exchanger of the air-conditioning outdoor machine 117. According to this, heat which could not entirely be recovered by the heat-exchanging ventilating unit 130 is further recovered, and ventilation air-conditioning with further saved energy can be realized.

Outdoor air introducing volume introduced by the heat-exchanging ventilating unit 130 and exhaust gas volume to outdoor are basically equal to each other, and when a floor area is about 100 m² and a ceiling height is 2.5 m and the number of ventilation operations is 0.5 times/h in the normal positive pressure mode, ventilation air volume of 24 hours is 125 m³/h. When harmful material is generated and flows in, in the negative pressure mode, exhaust gas volume is increased by about 150 m³/h in the entire building with large air volume by the ventilation fan 28 in the room where the harmful material is generated. Therefore, outdoor air introducing volume of the heat-exchanging ventilating unit 130 is also increased more than 300 m³/h, exhaust gas volume to outdoor is maintained at 125 m²/h, and supplying and discharging balance of the entire building is maintained. In the balance mode, outdoor air introducing volume is set to about 150 to 250 m³/h.

Blast volume of each air blowing section 13, total blast volume, ability and air-conditioned air volume of the air-conditioning section 15, exhaust gas volumes of the plurality of rooms and spaces and the like are determined in the same manner as the first embodiment.

To achieve the above-described air volume, the control section 160 controls blast volumes of the plurality of air blowing sections 13, set temperature and air-conditioned air volume of the air-conditioning section 15, angles of the opening/closing plates 41 and 47 of the opening/closing mechanisms 21 and 27, exhaust gas volume of the ventilation fan 28, outdoor air introducing volume of the heat-exchanging ventilating unit 130 and the like.

It is preferable that the total heat exchanging element 131 of this embodiment includes absorbent material such as activated carbon. The activated carbon has such structure and material quality that discharging air side moisture discharged to the outdoor 25 appropriately moves toward outdoor air introduced into the building, but smell thereof does not easily move.

Concerning usage under such an environment that amounts of condensation and smell are large, a sensible-heat heat exchange element may be used instead of the total heat exchanging element 131 although heat exchanging efficiency is poor and drainage work of drain water is required.

According to this, a room is not selected, the positive pressure mode is normally selected, the opening/closing mechanism 21 of the exhaust port 22 of each of the rooms is opened, the opening/closing mechanisms 27 of the exhaust ports 26 directing to outdoor is closed, a portion of return air which is air after air conditioning flows into the air-conditioning compartment 10, the portion of the return air heat exchanges with outdoor air by the heat-exchanging ventilating unit 130, and the return air is discharged to outdoor. Both the heat-exchanged outdoor air and the portion of the return air are air-conditioned by the air-conditioning section 15. Mixed air of the outdoor air, the air-conditioned air and the return air is sent from the air-intake portions 16 of the plurality of rooms directly through the duct 17 by the plurality of air blowing sections 13. By adjusting blast volume by the air blowing section 13, return air volume passing through the exhaust port 22, exhaust gas volume by the heat-exchanging ventilating unit 130 and outdoor air introducing volume, air conditioning corresponding to a load of the room is carried out, more exhaust gas heat is recovered, and heat and air quality of a portion of air-conditioned air are reutilized for air conditioning. Therefore, it is possible to realize more energy saving efficient ventilation air-conditioning.

When harmful material flows in or is generated in a certain room, the ventilation fan 28 of the room is operated or the opening/closing mechanisms 27 of the exhaust ports 26 is opened, the harmful material is swiftly discharged to the outdoor 25, the opening/closing mechanism 21 of the exhaust port 22 of the door 20 having high airtightness is closed, and a risk that harmful material or smell is dispersed to another room is reduced. In other rooms, by adjusting blast volume from the air-intake portion 16 by the air blowing section 13, return air volume from the exhaust port 22, exhaust gas volume by the heat-exchanging ventilating unit 130, and outdoor air introducing volume, air conditioning corresponding to a load of the room can be carried out, and by the heat recovery carried out by the heat-exchanging ventilating unit 130 from exhaust gas and the air-conditioning outdoor machine 117, heat and air quality of a portion of air after air conditioning are reutilized for air conditioning as return air. Therefore, it is possible to realize more energy saving efficient ventilation air-conditioning.

Outdoor air, air which is air-conditioned by the air-conditioning section 15 and return air are well mixed in the air-conditioning compartment 10 by air-conditioned air volume of the air-conditioning section 15 by the plurality of air blowing sections 13 and total blast volume of the air-conditioning section 15 by the plurality of air blowing sections 13 which is greater than the outdoor air introducing volume of the heat-exchanging ventilating unit 130, and the air is sterilized and deodorized by the sterilizing/deodorizing device 40. Since large air volume of fresh air having a small temperature difference between outdoor air temperature and the average room temperature is sent to each room, each room can be brought into an air-cleaned comfortable and healthy space having uniform temperature.

By driving a compressor or the like of the air-conditioning outdoor machine 117, total blast volume having lower running cost per unit air volume and smaller air conditioning load than air-conditioned air volume having high running cost per unit air volume and outdoor air introducing volume having great air conditioning load per unit air volume is increased, mixed air having excellent air quality is circulated in the building and therefore, this system is energy saving.

Normally, operation of the ventilation fan 28 provided in the exhaust ports 26 directing to outdoor is stopped by the ventilation fan 28 provided in the exhaust ports 26 directing to outdoor. When harmful material flows in or is generated, large volume of air is discharged by the ventilation fan 28 of that room, and it is possible to realize ventilation air-conditioning capable of swiftly and reliably discharging the harmful material. Between periods of spring or fall or at night in summer, the opening/closing mechanism 21 of the exhaust port 22 of a room is closed, the opening/closing mechanisms 27 of the exhaust ports 26 directing to outdoor is opened, air volume of the ventilation fan 28 is adjusted, outdoor air is not heat-exchanged by the heat-exchanging ventilating unit 130, the outdoor air is introduced into the air-conditioning compartment 10, and air is supplied from the air-intake portion 16 of each room by the air blowing section 13, thereby air conditioning and ventilating by outdoor air. Therefore, it is possible to realize more energy saving and efficient ventilation air-conditioning.

The plurality of rooms and the filter box 120 are provided with the harmful material detecting means 33 and 36, and the control section 160 controls the air-conditioning section 15, the air blowing sections 13, the heat-exchanging ventilating unit 130, the ventilation fan 28, the opening/closing mechanism 21 of the exhaust port 22, the opening/closing mechanisms 27 of the exhaust ports 26 directing to outdoor and the like. Hence, energy saving comfortable operation is carried out in a state where air-conditioning takes priority normally in the positive pressure mode, and immediately after harmful material or smell is generated or when harmful material is dispersed or smell becomes strong, healthy operation is carried out by large exhaust gas volume in a state where ventilation takes priority. In other cases, it is possible to realize ventilation air-conditioning capable of automatically controlling such that healthy comfortable operation in which ventilation and air-conditioning are balanced is carried out in the balance mode.

The air-conditioning compartment 10 includes the sterilizing/deodorizing device 40. Therefore, even exhaust fan harmful material is generated or flows in in anywhere in the building, air which is not discharged to outdoor by the ventilation fan 28 or the heat-exchanging ventilating unit 130 circulates in the building in large air volume as return air, and the harmful material is sterilized and deodorized by the sterilizing/deodorizing device 40 in the air-conditioning compartment 10. Hence, all of harmful material in the building can be discharged to outdoor or can be sterilized or deodorized.

INDUSTRIAL APPLICABILITY

This system can create flow of efficiently ventilated and air-conditioned air in entire building, and if a building has a risk that harmful material is generated or flows in, the system can be applied to ventilation air-conditioning of the building such as not only a general residential house, but also a hotel or office, commercial facility, hospital, factory, research facility and the like having a large number of rooms.

EXPLANATION OF SYMBOLS 1 conditioning ventilation system
5 room A
6 room B
7 recuperation room
10 air-conditioning compartment
11 outside air introducing port
12 suction port
13 air blowing section
14 return air port
15 air-conditioning section
16 air-intake portion
17 duct
18 door
19 exhaust port (exhaust means)
20 door having high airtightness
21 opening/closing mechanism
22 exhaust port (exhaust means)
25 outdoor
26 exhaust port directing to outdoor (exhaust means directing to outdoor)
27 opening/closing mechanism
28 ventilation fan
29 outdoor hood
30 outdoor air introducing fan
31 duct
32 duct
33 harmful material detecting means
34 HEPA filter
35 fan motor
36 harmful material detecting means
40 sterilizing/deodorizing device 41 opening/closing plate
42 shaft
43 door airtight portion
44 door projection
45 exhaust port airtight portion
46 exhaust port projection
47 opening/closing plate
48 shaft
50 wooden frame
51 exhaust port airtight portion
52 exhaust port projection
55 wall
60 control section
61 signal line
100 conditioning ventilation system
110 duct
111 duct
114 outer wall
115 air-intake port
116 exhaust port
117 air-conditioning outdoor machine
118 partition wall
120 filter box
130 heat-exchanging ventilating unit
131 total heat exchanging element
160 control section
161 signal lines

The invention claimed is:

1. A conditioning ventilation system wherein
each of a plurality of rooms in a building is provided with an air-intake portion, an exhaust means A and an exhaust means B directing to outdoor having an opening/closing mechanism B capable of adjusting its opening/closing amount and capable of completely closing exhaust gas toward outdoor from the room,
a space other than a living room other than the plurality of rooms is provided with the air-intake portion and the exhaust means A,
an air blowing section which sends wind through a duct is connected to each of the air-intake portion,
the conditioning ventilation system is provided with a return air path which joins up from the plurality of exhaust means A and which returns to an air-conditioning compartment having at least one air conditioning section and the plurality of air blowing sections,
an outdoor air introduction path C having an opening/closing mechanism C capable of adjusting its opening/closing amount and capable of completely closing the same is connected to the return air path, and outdoor air is introduced,
return air from the plurality of rooms and spaces, the outdoor air and air which is air-conditioned by the air conditioning section are circulated in the building by the air blowing section, and, in this state,
volume of air which is discharged from the room to outdoor can be adjusted from 0 by the opening/closing mechanism B of the exhaust means B directing to outdoor of the room independently in the plurality of rooms when wind is sent from the air-intake portion of the room, and outdoor air introducing volume which is introduced into the building can be adjusted by the opening/closing mechanism C,
wherein the building is provided therein with an other room other than the plurality of rooms, the other room is provided with an air-intake portion having an exhaust means B directing to outdoor, an opening/closing mechanism B and a door in a state where the door is closed,
air from an opening formed by opening the door joins up with the outdoor air in midstream of the return air path,
volume of air which is discharged from the other room outdoor can be adjusted from 0 by the opening/closing mechanism B of the exhaust means B directing to outdoor of the other room when wind is sent from the air-intake portion of the other room, and existence or non-existence of return air from the other room can be switched by opening or closing the door.

2. The conditioning ventilation system according to claim 1, wherein the other room is provided with a ventilation fan upstream or downstream of a wind path of the exhaust means B directing to outdoor.

3. The conditioning ventilation system according to claim 1, wherein the other room is provided with the door and an exhaust means D having an opening/closing mechanism D connected to the return air path and capable of adjusting an opening/closing amount and capable of completely closing itself, air volume of the return air from the other room can be adjusted by the opening/closing mechanism D.

4. A conditioning ventilation system wherein
each of a plurality of rooms in a building is provided with an air-intake portion, an exhaust means A and an exhaust means B directing to outdoor having an opening/closing mechanism B capable of adjusting its opening/closing amount and capable of completely closing exhaust gas toward outdoor from the room,
a space other than a living room other than the plurality of rooms is provided with the air-intake portion and the exhaust means A,
an air blowing section which sends wind through a duct is connected to each of the air-intake portion,
the conditioning ventilation system is provided with a return air path which joins up from the plurality of exhaust means A and which returns to an air-conditioning compartment having at least one air conditioning section and the plurality of air blowing sections,
in which an indoor air discharging path and an outdoor air introduction path D are connected to the return air path,
midstreams of the indoor air discharging path and the outdoor air introduction path D are provided with a heat-exchanging ventilating unit,
return air from the plurality of rooms and spaces, the outdoor air and air which is air-conditioned by the air conditioning section are circulated in the building by the air blowing section, and, in this state,
volume of air which is discharged from the room to outdoor can be adjusted from 0 by the opening/closing mechanism B of the exhaust means B directing to outdoor of the room independently in the plurality of rooms when wind is sent from the air-intake portion of the room,
wherein the building is provided therein with an other room other than the plurality of rooms, the other room is provided with an air-intake portion having an exhaust means B directing to outdoor, an opening/closing mechanism B and a door,
air from an opening formed b opening the door joins up with the outdoor air in midstream of the return air path,
volume of air which is discharged from the other room to outdoor can be adjusted from 0 by the opening closing mechanism B of the exhaust means B directing to outdoor of the other room when wind is sent from the air-intake portion of the other room, and existence or non-existence of return air from the other room can be switched by opening or closing the door, the heat-exchanging ventilating unit heat-exchanges between the outdoor air introduced from the outdoor air introduction path D and a portion of return air from at least one of the exhaust means A and the opening formed by opening the door and, in this state, a portion of the return air is discharged to outdoor by the indoor air discharging path, and outdoor air introducing volume introduced into the building can be adjusted by the heat-exchanging ventilating unit, wherein total blast volume of the plurality of air blowing sections is set greater than air-conditioned air volume of the air conditioning section and the outdoor air introducing volume.

5. A conditioning ventilation system in which each of a plurality of rooms in a building is provided with an air-intake portion, an exhaust means D having an opening/closing mechanism D capable of adjusting its opening/closing amount and capable of completely closing itself, an exhaust means B directing to outdoor having an opening/closing mechanism B capable of adjusting its opening/closing amount and capable of completely closing exhaust gas toward outdoor from the room, and a door in a state where the door is closed, a space other than a living room other than the plurality of rooms is provided with the air-intake portion and an exhaust means A, an air blowing section which sends wing through a duct is connected to each of the air-intake portions, the conditioning ventilation system is provided with a return air path which joins up with the plurality of exhaust means D and the exhaust means A, and which returns to an air-conditioning compartment having at least one air conditioning section and the plurality of air blowing sections, an outdoor air introduction path C having an opening/closing mechanism C capable of adjusting its opening/closing amount and capable of completely closing itself is connected to the return air path, and outdoor air is introduced, an indoor air discharging path and an outdoor air introduction path D are connected to the return air path, millstreams of the indoor air discharging path and the outdoor air introduction path D are provided with a heat-exchanging ventilating unit, the heat-exchanging ventilating unit heat-exchanges between the outdoor air introduced from the outdoor air introduction path D and a portion of return air from at least one of the exhaust means A and the exhaust means D and, in this state, a portion of the return air is discharged to outdoor by the indoor air discharging path, return air from at least one of the plurality of rooms and the space, the outdoor air and air which is air-conditioned by the air conditioning section are circulated in the building by the air blowing section and, in this state, volume of air which is discharged from the room to outdoor can be adjusted from 0 by the opening/closing mechanism B of the exhaust means B directing to outdoor of the room independently in the plurality of rooms when wind is sent from the air-intake portion of the room, outdoor air introducing volume which is introduced into the building can be adjusted by the opening/closing mechanism C and the heat-exchanging ventilating unit, return air volume from the plurality of rooms can be adjusted by the opening/closing mechanism D of the exhaust means D independently in the plurality of rooms, wherein total blast volume of the plurality of air blowing sections is set greater than air-conditioned air volume of the air conditioning section and the outdoor air introducing volume.

6. The conditioning ventilation system according to claim 5, wherein the room is provided with a ventilation fan upstream or downstream of a wind path of the exhaust means B directing to outdoor.

7. The conditioning ventilation system according to claim 5, further comprising a control section connected to the air blowing section, the opening/closing mechanism D and the opening/closing mechanism B, wherein the control section, in each of the rooms, in a positive pressure mode, operates the air blowing section, completely opens the opening/closing mechanism D, and completely closes the opening/closing mechanism B, and in a balance mode, operates the air blowing section, completely closes the opening/closing mechanism D, and completely opens the opening/closing mechanism B.

8. The conditioning ventilation system according to claim 7, wherein the room is provided with harmful material detecting means connected to the control section, the control section determines whether the mode is the positive pressure mode or the balance mode in each of the plurality of rooms based on a level of harmful material detected by the harmful material detecting means.

9. The conditioning ventilation system according to claim 5, wherein midstream of the return air path is provided with at least one of sterilizing means and deodorizing means, a motor of each of the plurality of air blowing sections is a DC motor, total air volume of volume of air which is discharged to outdoor by at least any one of the exhaust means B and the heat-exchanging ventilating unit and volume of air which is processed by one of the sterilizing means and the deodorizing means is six times or more of volume of the building per one hour.

10. The conditioning ventilation system according to claim 9, wherein the sterilizing means is a HEPA filter capable of capturing virus of particle diameter of 0.1 μmd or more, and the sterilizing means is provided in a return air port of the air-conditioning compartment.

11. A conditioning ventilation system wherein each of a plurality of rooms in a building is provided with an air-intake portion, an exhaust means A and an exhaust means B directing to outdoor having an opening/closing mechanism B capable of adjusting its opening/closing amount and capable of completely closing exhaust gas toward outdoor from the room, a space other than a living room other than the plurality of rooms is provided with the air-intake portion and the exhaust means A, an air blowing section which sends wind through a duct is connected to each of the air-intake portion, the conditioning ventilation system is provided with a return air path which joins up from the plurality of exhaust means A and which returns to an air-conditioning compartment having at least one air conditioning section and the plurality of air blowing sections, an outdoor air introduction path C having an opening/closing mechanism C capable of adjusting its opening/closing amount and capable of completely closing the same is connected to the return air path, and outdoor air is introduced, return air from the plurality of rooms and spaces, the outdoor air and air which is air-conditioned by the air conditioning section are circulated in the building by the air blowing section, and, in this state, volume of air which is discharged from the room to outdoor can be adjusted from 0 by the opening/closing mechanism B of the exhaust means B directing to outdoor of the room independently in the plurality of rooms when wind is sent from the air-intake portion of the room, and outdoor air introducing volume which is introduced into the building can be adjusted by the opening/closing mechanism C, wherein midstream of the return air path is provided with at least one of sterilizing means and deodorizing means, a motor of each of the plurality of air blowing sections is a DC motor, total air volume of volume of air which is discharged to outdoor by the exhaust means B, and volume of air which is processed by one of the sterilizing means and the deodorizing means is six times or more of volume of the building per one hour.

12. The conditioning ventilation system according to claim 11, wherein the sterilizing means is a HEPA filter capable of capturing virus of particle diameter of 0.1 μm or more, and the sterilizing means is provided in a return air port of the air-conditioning compartment.

* * * * *